United States Patent
Alidedeoglu et al.

(10) Patent No.: US 9,771,474 B2
(45) Date of Patent: Sep. 26, 2017

(54) HYDROSTABILITY OF POLYBUTYLENE TEREPHTHALATE COMPOSITION

(71) Applicant: SABIC INNOVATIVE PLASTICS IP B.V., Bergen Op Zoom (NL)

(72) Inventors: Husnu Alp Alidedeoglu, Evansville, IN (US); Tianhua Ding, Newburgh, IN (US); Ganesh Kannan, Evansville, IN (US)

(73) Assignee: SABIC Global Technologies B.V., Pittsfield, MA (US)

(*) Notice: Subject to any disclaimer, the term of this patent is extended or adjusted under 35 U.S.C. 154(b) by 0 days.

(21) Appl. No.: 13/951,111

(22) Filed: Jul. 25, 2013

(65) Prior Publication Data
US 2014/0031466 A1    Jan. 30, 2014

Related U.S. Application Data

(60) Provisional application No. 61/677,231, filed on Jul. 30, 2012.

(51) Int. Cl.

| *C08K 3/24*  | (2006.01) |
|---|---|
| *C08K 3/40*  | (2006.01) |
| *C08K 5/103* | (2006.01) |
| *C08J 11/06* | (2006.01) |
| *C08L 67/02* | (2006.01) |
| *C08G 63/85* | (2006.01) |
| *C08K 5/372* | (2006.01) |
| *C08L 69/00* | (2006.01) |
| *C08K 3/00*  | (2006.01) |
| *C08J 11/16* | (2006.01) |
| *C08J 11/24* | (2006.01) |
| *C08G 63/183* | (2006.01) |

(52) U.S. Cl.
CPC ............ *C08L 67/02* (2013.01); *C08G 63/183* (2013.01); *C08G 63/85* (2013.01); *C08J 11/16* (2013.01); *C08J 11/24* (2013.01); *C08K 3/0041* (2013.01); *C08K 5/103* (2013.01); *C08K 5/372* (2013.01); *C08L 69/00* (2013.01); *C08J 2367/02* (2013.01); *Y02P 20/582* (2015.11); *Y02W 30/705* (2015.05); *Y02W 30/706* (2015.05)

(58) Field of Classification Search
USPC ............ 528/279, 286; 521/48; 524/311, 495
See application file for complete search history.

(56) References Cited

U.S. PATENT DOCUMENTS

| 4,096,156 | A  |   | 6/1978  | Freudenberger et al. |         |
|---|---|---|---|---|---|
| 4,328,059 | A  |   | 5/1982  | Horlbeck et al. |         |
| 4,564,658 | A  | * | 1/1986  | Liu .............................. | 525/177 |
| 4,891,397 | A  | * | 1/1990  | Liu .............................. | 524/141 |
| 5,266,601 | A  |   | 11/1993 | Kyber et al. |         |
| 5,451,611 | A  |   | 9/1995  | Chilukuri et al. |         |
| 5,453,479 | A  | * | 9/1995  | Borman et al. ............... | 528/279 |
| 6,060,393 | A  |   | 5/2000  | Ngo et al. |         |
| 6,303,738 | B1 |   | 10/2001 | Putzig et al. |         |
| 6,472,557 | B1 |   | 10/2002 | Pell, Jr. |         |
| 6,762,235 | B2 | * | 7/2004  | Takenaka et al. ............ | 524/494 |
| 7,129,301 | B2 |   | 10/2006 | Wu et al. |         |
| 7,799,836 | B2 |   | 9/2010  | Agarwal et al. |         |
| 7,902,263 | B2 |   | 3/2011  | Agarwal et al. |         |
| 8,138,233 | B2 |   | 3/2012  | Agarwal et al. |         |
| 2003/0027909 | A1 | * | 2/2003 | Dotson ........................ | 524/394 |
| 2003/0149223 | A1 |   | 8/2003 | McCloskey et al. |         |
| 2005/0113534 | A1 |   | 5/2005 | Agarwal et al. |         |
| 2007/0208160 | A1 |   | 9/2007 | Agarwal et al. |         |
| 2007/0244242 | A1 | * | 10/2007 | Agarwal et al. .............. | 524/439 |
| 2009/0275698 | A1 |   | 11/2009 | Ravi et al. |         |
| 2011/0071235 | A1 |   | 3/2011 | Kannan et al. |         |
| 2013/0018130 | A1 |   | 1/2013 | Alidedeoglu et al. |         |
| 2013/0018131 | A1 |   | 1/2013 | Alidedeoglu et al. |         |
| 2013/0018142 | A1 |   | 1/2013 | Alidedeoglu et al. |         |
| 2013/0018143 | A1 |   | 1/2013 | Alidedeoglu et al. |         |
| 2013/0053461 | A1 |   | 2/2013 | Alidedeoglu et al. |         |

FOREIGN PATENT DOCUMENTS

| EP | 1437377    | 7/2004 |
|---|---|---|
| JP | 60147430   | 8/1985 |
| WO | 2007089747 | 8/2007 |
| WO | 2013033285 | 3/2013 |

OTHER PUBLICATIONS

JP2002-512267, Machine Translation, 16 pages, Apr. 2002.*
JP2001-114884, English Abstract, 3 pages, Apr. 2001.*
International Search Report of PCT/US2013/052060, dated Oct. 14, 2013.
R. Fonseca, D. Shah. "Plastic Compounder's PET Project: Recycling." Machine Design, Sep. 11, 2008.

* cited by examiner

*Primary Examiner* — Tae H Yoon
(74) *Attorney, Agent, or Firm* — Honigman Miller Schwartz & Cohn LLP; Heidi M. Berven

(57) ABSTRACT

Disclosed is a process for the manufacture of a modified polyalkylene terephthalate such as modified polybutylene terephthalate. In particular, the process comprises employing a titanium-containing catalyst formed by the reaction product of tetraalkyl titanate and a complexing agent comprising a phosphorous, nitrogen or boron atom. The process is used to prepare modified polyalkylene terephthalates characterized by improved hydrostability, as well as compositions derived therefrom.

1 Claim, 2 Drawing Sheets

HYDROSTABILITY OF POLYBUTYLENE TEREPHTHALATE COMPOSITION

CROSS REFERENCE TO RELATED APPLICATIONS

This application claims the benefit of U.S. Provisional Patent Application Ser. No. 61/677,231, filed Jul. 30, 2012, which is incorporated herein by reference in its entirety.

TECHNICAL FIELD OF THE INVENTION

Disclosed is a process for the manufacture of a modified polyalkylene terephthalate such as modified polybutylene terephthalate. In particular, the process comprises employing a titanium-containing catalyst formed by the reaction product of tetraalkyl titanate and a complexing agent comprising a phosphorous, nitrogen or boron atom. The process is used to prepare modified polyalkylene terephthalates characterized by improved hydrostability, as well as compositions derived therefrom.

BACKGROUND OF THE INVENTION

Polybutylene terephthalate (PBT) is a well-known semi-crystalline resin that has desirable properties. Compared to amorphous resins such as ABS, polycarbonate, and polystyrene, a crystalline resin like PBT will show much better solvent resistance, higher strength, and higher stiffness due to the presence of crystalline spherulites in the resin. PBT resin is used in many applications where its solvent resistance, strength, lubricity, and rigidity are needed, commonly in durable goods that are formed by injection molding, such as in electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. PBT is very widely used to form electrical connectors. Through its many blended products, PBT can be tailored to meet a wide variety of end uses.

Conventional PBT molding compositions generally cannot be made from recycled sources of PBT due to the lack of availability of large supplies of post-consumer or post-industrial PBT scrap materials. Polyethylene terephthalate (PET), unlike PBT, is made in much larger quantities and is more easily recovered from consumer wastes or the like.

With increasing demand for conserving non-renewable resources and for more effectively recycling underutilized scrap PET, improved and less costly processes have been sought for deriving PBT or other polyalkylene terephthalates from scrap PET materials, in particular if the resulting derived polyalkylene terephthalate compositions possess desirable physical properties such as tensile strength, impact strength, and thermal properties.

Polyalkylene terephthalate made from recycled or scrap PET is herein referred to as "modified polyalkylene terephthalate," including "modified PBT," wherein the polymer is modified by containing at least one residue derived from the polyethylene terephthalate component used in the process. The residue can be either incorporated into the structure of the polymer or present in admixture with the resin composition. Thus, the modified polyalkylene terephthalates can identifiably differ slightly from PBT that is not made from scrap PET ("virgin PBT") by such modifications which, however, can be controlled so that the modified PBT has desirable properties comparable or similar to virgin PBT with little or no adverse effects.

Modified polyalkylene terephthalate can generally be made by reacting alkylene diol such as 1,4-butanediol with PET particulates, for example flakes, in the presence of a transesterification catalyst, for instance, as disclosed in U.S. Pat. No. 7,902,263. In general, processes for preparing polyesters by depolymerizing aromatic polyesters in the presence of polyols are known in the art. For example, U.S. Pat. No. 5,451,611 describes a process for converting waste polyethylene terephthalate (PET) to either poly(ethylene-co-butylene terephthalate) or polybutylene terephthalate by reaction with butanediol. Example 11 of U.S. Pat. No. 5,451,611 patent shows a PBT polymer being formed with a complete replacement of ethylene glycol by butanediol. U.S. Pat. No. 5,266,601 and published U.S. Pat Application 20090275698 (A1) describe a process for making PBT from PET by reacting PET with butanediol.

U.S. Pat. Nos. 7,129,301; 6,020,393; 4,328,059, and United States Publication No. 2005/0113534 disclose various catalysts for the polymerization of polyesters. Tetraalkyl titanates have been most commonly used as catalysts for PBT polymerization. The various titanates can include tetraisopropyl titanate, tetrabutyl titanate, and tetra(2-ethylhexyl) titanate. JP 60147430 discloses a method of producing polyester by esterifying terephthalic acid, adipic acid and 1,4-butanediol in the presence of titanium compound and a pentavalent phosphorus compound. U.S. Pat. No. 6,303,738 B1 discloses a process for producing copolyester containing adipic acid in the presence of TYZOR IAM (available from DuPont), which was prepared through the combination of TPT (tetraisopropyl titanate) and a mixture of butyl phosphate and dibutyl phosphate. These catalysts, however, have not been used for the production of modified polyalkylene terephthalates from PET.

At the end of the polymerization process, the catalyst is typically not quenched (deactivated) in the resin composition. Unfortunately, an active catalyst in the resin composition can sometimes lead to undesirable reactions in subsequent processing of the modified polyalkylene terephthalate to make blends or compositions. On exposure to high temperature and humidity, blends and compositions containing the modified polyalkylene terephthalate can exhibit hydrolytic degradation, especially under caustic conditions. Another problem associated with some blends is transesterification, which can lead to loss of mechanical properties.

Catalyst quenchers such as phosphoric acid can be added to thermoplastic compositions to prevent such transesterification, but they can also promote degradation of polymer chains and contribute to a decrease in polymer molecular weight and greater hydrolytic instability. The use of phosphite stabilizers is less satisfactory because of the tendency for phosphites to be unstable to both hydrolysis and oxidation. Although the use of chain extenders can help to counterbalance the effect of the quencher, it is desirable to eliminate the use of either quencher or chain extender additives as a necessity.

Insufficient hydrostability of modified polyalkylene terephthalate can lead to chain cleavage, the extent of which depends on the exact conditions of exposure to water or humidity. Temperature, time of exposure, and pH are all important. Both acids and bases can catalyze ester hydrolysis. Decomposition of modified polyalkylene terephthalate can be accelerated in aqueous acid or base, or if the polymer matrix of modified polyalkylene terephthalate contains free acid or base additives. Since a reaction product of polyalkylene terephthalate hydrolysis is itself a carboxylic acid, the hydrolytic decomposition of a polyalkylene terephthalate such as PBT is autocatalytic, as depicted in Scheme 1.

Scheme 1

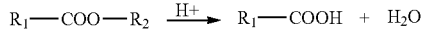

$$R_1\text{---}COO\text{---}R_2 \xrightarrow{H+} R_1\text{---}COOH + H_2O$$

Thus, a need remains for new and improved catalysts or processes for the production of modified polyalkylene terephthalates that are effective in polymerization, but that do not adversely impact the properties of the resulting modified polyalkylene terephthalate. There is also a need eliminate the necessity of using either quencher or chain extender additives in preparing modified polyalkylene terephthalates. There is a further need for modified polyalkylene terephthalates with improved properties including hydrostability as well as polymer compositions derived therefrom.

SUMMARY OF THE INVENTION

These and other needs are met by the present invention which is directed to modified polyalkylene terephthalates such as polybutylene terephthalate with improved properties such as hydrostability as well as polymer blends and compositions derived therefrom. The modified polyalkylene terephthalates such as polybutylene terephthalate are prepared by a novel process that employs a catalyst that is the reaction product of a tetraalkyl titanate and a complexing agent. The complexing agent is selected from phosphorus-containing compounds, nitrogen-containing compounds, boron-containing compounds, and combinations thereof. The catalyst, which can be synthesized in-situ, is present during depolymerization of the polyethylene terephthalate starting material, ester interchange with an alkylene diol, and subsequent polymerization of the modified PBT.

This process solves the problem described in the prior art regarding undesirable post-polymerization catalytic activity. In particular, use of an in situ titanium-based catalyst according to the present process can improve hydrolytic stability of the poly(alkylene) terephthalate resin and blends thereof by reducing or eliminating transesterification reactions in later processing, especially in blends susceptible to transesterification. Furthermore, use of the catalyst allows the beneficial exclusion of catalyst quenchers in thermoplastic compositions containing the modified polyalkylene terephthalate resin composition. For example, it is not necessary to add a catalyst quencher compounding or compounding of additives prior to extrusion. Such thermoplastic compositions can, therefore, show improved properties under conditions that can otherwise promote transesterification or hydrolytic degradation of the thermoplastic composition.

In one aspect, the invention is directed to a modified polyalkylene terephthalate with improved hydrostability, containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The tetra($C_1$-$C_8$ alkyl) titanate and phosphorous containing compound are both present during the process for making the modified polyalkylene terephthalate, from depolymerization of the polyethylene terephthalate starting material, through ester interchange with an alkylene diol, and subsequent polymerization of the modified PBT. Improved hydrostability is not observed in the modified polyalkylene terephthalate when the phosphorous containing compound is not contained in the tetra($C_1$-$C_8$ alkyl) titanate prior to depolymerization. That is, subsequent addition of the phosphorous-containing compound does not provide favorable results.

In another aspect, the invention is directed to a hydrostable thermoplastic composition, comprising:
50 to 99.99 percent by weight of a modified polyalkylene terephthalate containing 50 to 300 ppm of tetra($C_1$-$C_8$ alkyl) titanate and 100 to 600 ppm of a phosphorous contains compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and
0 to 60 percent by weight of a reinforcing filler;
wherein all weight percents are based on the total weight of the composition; and
wherein no quencher for the catalyst complex is added to the compounded thermoplastic composition; and
wherein essentially no quencher for the catalyst complex is added to the compounded thermoplastic composition.

In another aspect, the invention is directed to a hydrostable thermoplastic composition, comprising:
from 50 to 99.99 percent by weight of a modified polyalkylene terephthalate, wherein the modified polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;
from 0 to 60 percent by weight of a reinforcing filler;
from 0 to 30 percent by weight of an impact modifier or other polymer; and
from 0 to 5 percent by weight of an additive selected from the group consisting of a nucleating agent, antioxidant, UV stabilizer, plasticizer, melt strength additive, or a combination thereof, crosslinkers, and combinations thereof; and
wherein essentially no quencher for the catalyst complex is added to the compounded thermoplastic composition.

In another aspect, the invention is directed to a hydrostable thermoplastic composition, comprising:
from 50 to 99.99 percent by weight of a modified polyalkylene terephthalate, wherein the modified polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;
from 0 to 60 percent by weight of a reinforcing filler;
from 0 to 30 percent by weight of an impact modifier or other polymer; and
from 0 to 5 percent by weight of an additive selected from a nucleating agent, antioxidant, UV stabilizer, plasticizer, epoxy compound, melt strength additive, or a combination thereof, crosslinkers, and combinations thereof, and wherein no chain extender and essentially no quencher for the catalyst complex is added to the compounded thermoplastic composition.

These and other features, aspects, and advantages will become better understood with reference to the following description and appended claims.

DETAILED DESCRIPTION OF THE INVENTION

Figure 1:
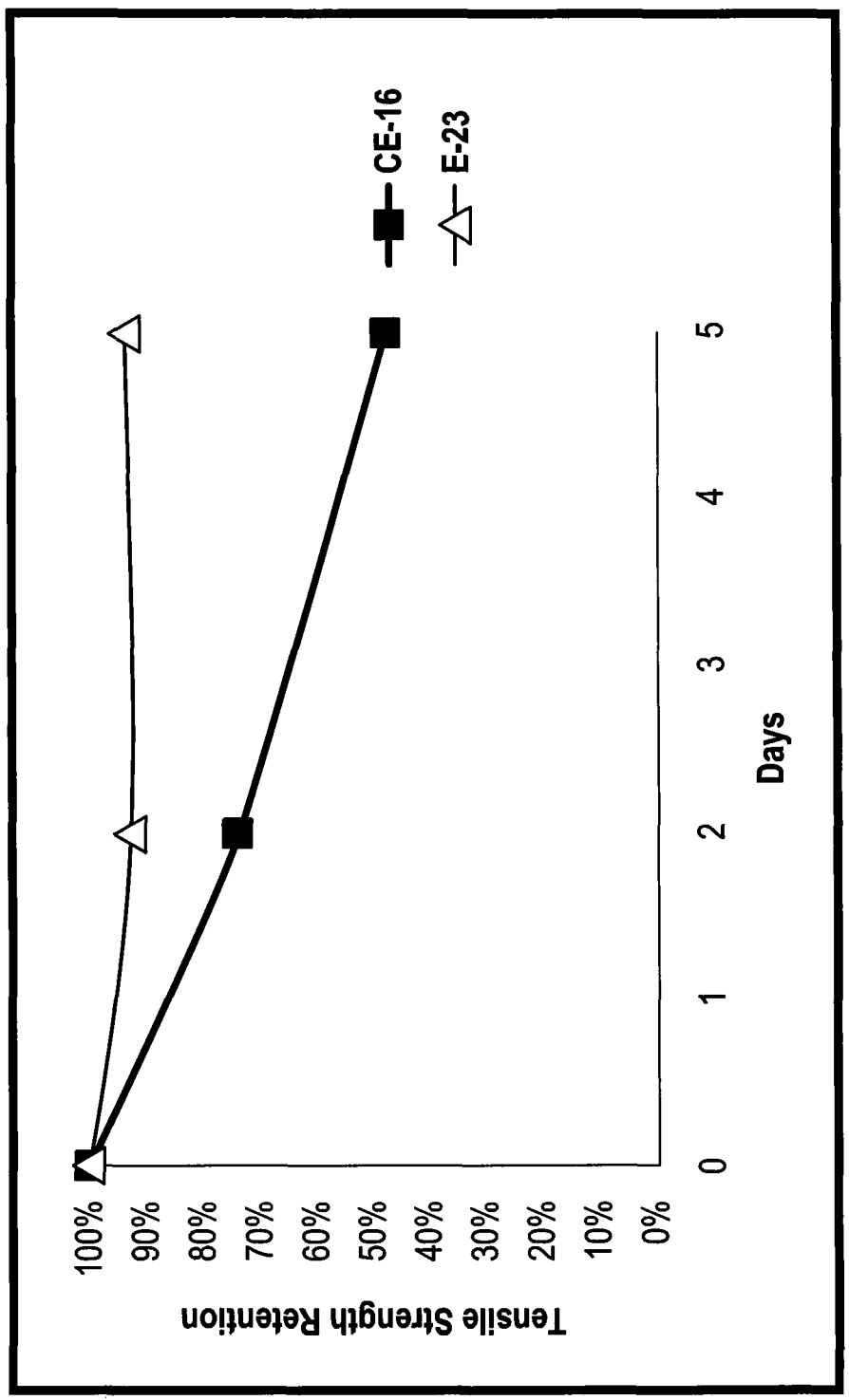
FIG. 1 shows tensile strength retention as a function of hydro-aging time for compositions containing modified PBT.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group" and "isophthalic acid group" ("diacid groups") or "ethylene glycol group," "butanediol group," and "diethylene glycol group" ("diol groups) being used to indicate, for example, the weight percent (percent by weight) of the group in a molecule, the term "isophthalic acid group(s)" means the group or residue of isophthalic acid having the formula ($-O(CO)C_6H_4(CO)-$), the term "terephthalic acid group" means the group or residue of isophthalic acid having the formula ($-O(CO)C_6H_4(CO)-$), the term "diethylene glycol group" means the group or residue of diethylene glycol having the formula ($-O(C_2H_4)O(C_2H_4)-$), the term "butanediol group" means the group or residue of butanediol having the formula ($-O(C_4H_8)-$), and the term "ethylene glycol group" means the group or residue of ethylene glycol having the formula ($-O(C_2H_4)-$).

The term "recycle" or "recycled" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biomass or biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived polyethylene terephthalate is derived from reactants that are themselves derived from petroleum.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols and monomers used to make diols. Biomass based butane diol can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butane diol by processes described in several published documents such as in U.S. Pat. No. 4,096,156, incorporated herein in its entirety. Another process that describes converting succinic acid into 1,4-butane diol is described in Life Cycles Engineering Guidelines, by Smith et al., as described in EPA publication EPA/600/R-1/101 (2001).

"Modified polyalkylene terephthalate," including "modified PBT," means a polyalkylene terephthalate made from recycled or scrap PET. The polymer is modified in that it contains at least one residue derived from the polyethylene terephthalate component used in the process.

The term "contain" as it refers to a modified polyalkylene terephthalate containing the catalyst described herein, means that the catalyst, which can be synthesized in-situ, is present during depolymerization of the polyethylene terephthalate starting material, ester interchange with an alkylene diol, and subsequent polymerization of the modified terephthalate, so that the catalyst is present in the isolated modified polyalkylene terephthalate product.

In this application, parts per million (ppm) as relating, for instance, to ppm of tetra($C_1$-$C_8$ alkyl) titanate and ppm of a phosphorous containing compound in the modified polyalkylene terephthalate or compositions derived therefrom, is based on the total amount of titanium contained in the modified polyalkylene terephthalate.

In this application, the phrase "wherein essentially no quencher for the catalyst complex is added to the compounded thermoplastic composition" means that no quencher is intentionally added to the thermoplastic composition.

Unless otherwise specified, amounts are indicated in percents by weight based on the total weight of the composition.

Process

The invention described herein is based on the discovery that it is possible to produce modified polyalkylene terephthalate from polyethylene terephthalate feedstock (including recycled polyethylene terephthalate or "scrap" polyethylene terephthalate) and a selected group of diols in the presence of a novel titanium-containing catalyst complex comprising the reaction product of a tetraisopropyl titanate with a complexing agent selected from the group consisting of phosphorus-containing compounds, nitrogen-containing compounds, boron-containing compounds, and combinations thereof.

The process of preparing a modified polyalkylene terephthalate by melt polycondensation comprises reacting an alkylene diol and polyethylene terephthalate, wherein polymerization occurs in the presence of a catalyst complex formed by reaction of a tetra($C_1$-$C_8$ alkyl) titanate such as tetraisopropyl titanate and a complexing agent selected from phosphorus-containing compounds, nitrogen-containing compounds, boron-containing compounds, and combinations thereof. The catalyst can be synthesized in situ, prior to depolymerisation of the polyethylene terephthalate, by adding the components of the catalyst to a solution comprising alkylene diol used in the process. At least 90 mol %, specifically at least 95 mol %, more specifically at least 98 mol % of the diacid groups in the modified polyalkylene terephthalate are terephthalic acid groups.

The titanium catalyst comprises the reaction product of a tetra($C_1$-$C_8$ alkyl) titanate such as tetraisopropyl titanate and a reactant selected from:

(1) phosphorus-containing compounds, at a molar ratio of the phosphorus-containing compound:titanate from 0.05:1 to less than or equal to 1.2:1, specifically 0.2:1 to 1.2:1, more specifically 0.3:1 to 1.2:1, most specifically 0.5:1 to 1.2:1, (2) nitrogen-containing compounds, at a molar ratio of the nitrogen-containing compound:titanate from 0.05:1 to less than or equal to 1.2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 1.2:1, specifically 0.2:1 to 1.2:1, more specifically 0.3:1 to 1.2:1, most specifically 0.5:1 to 1.2:1, and (4) combinations thereof.

Phosphorus-containing compounds include phosphoric acid, poly(phosphoric acid), phosphorous acid, monoalkyl phosphates such as monobutyl phosphate, dialkyl phosphates dibutyl phosphate, and combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

In regard to these complexing agents, alkyl groups specifically can be $C_1$ to $C_8$, specifically $C_2$ to $C_6$ alkyl groups, more specifically $C_3$ to $C_5$ alkyl groups.

In one embodiment, the titanium-containing catalyst comprises the reaction product of tetra($C_1$-$C_8$ alkyl) titanate, specifically tetraisopropyl titanate, and a phosphorous-containing compound, specifically phosphoric acid, at a molar ratio of the phosphorous-containing compound:tetra($C_1$-$C_8$ alkyl) titanate, specifically at a molar ratio of phosphorous acid:tetraisopropyl titanate from more than 0.2:1 to 0.9:1 and more specifically at a molar ratio of 0.6:1 to 0.9:1. Modified polybutylene terephthalate of good quality and properties can be produced with this catalyst, in which the properties are similar to, or essentially the same, virgin polybutylene terephthalate.

In particular, the present process can comprise forming a catalyst in situ by combining a tetra($C_1$-$C_8$ alkyl) titanate such as tetraisopropyl titanate with a complexing agent such as phosphoric acid, and an alkylene diol, prior to addition of the polyethylene terephthalate starting material. The catalyst solution can be heated to an elevated first temperature.

The catalyst solution can be combined with polyethylene terephthalate, optionally with further alkylene diol, to obtain a catalyzed reactant mixture. The catalyzed reactant mixture can be subjected to heat to obtain substantially complete depolymerization and ester interchange at an elevated second temperature, typically in the range of 170-230° C., specifically 180 to 220° C., which is typically higher than the first temperature. Such depolymerization can be carried out at a pressure of at least about atmospheric pressure under an inert atmosphere, for example, under nitrogen.

Specifically, in the preparation of modified polybutylene terephthalate, the polyethylene terephthalate component can be reacted with 1,4-butane diol under inert atmosphere and under conditions that are sufficient to depolymerize the polyethylene terephthalate component into a molten mixture containing oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, and/or the like. Polyester moieties and the 1,4-butane diol can be combined in the molten phase under agitation, and the 1,4-butane diol can be continuously refluxed back into the reactor during depolymerization. In one embodiment, 1,4-butane diol is refluxed back into the reactor during depolymerization while excess butanediol, ethylene glycol and tetrahydrofuran are removed during or after depolymerization.

The polyethylene terephthalate component and the 1,4-butane diol component can be combined under atmospheric pressure. In another embodiment, however, it is possible to use pressures that are higher than atmospheric pressures. For instance, in one embodiment, the pressure under which the polyethylene terephthalate component and the 1,4-butane diol are subjected is 2 atmospheres or higher.

The temperature at which the polyethylene terephthalate component and the 1,4-butane diol component are combined and reacted is sufficient to promote depolymerization of the polyethylene terephthalate component into polyethylene terephthalate and polybutylene terephthalate oligomers, 1,4-butane diol, and ethylene glycol. The 1,4-butane diol is generally used in excess amount relative to the polyethylene terephthalate, for example recycled PET scrap. In one embodiment, 1,4-butane diol is used in a molar excess amount ranging from 2 to 20 mol %.

The duration of the time in which recycled PET reacts with 1,4-butane diol can vary, depending on factors, such as available equipment, production needs, desired final properties, and the like. In one embodiment, the depolymerization is carried out for at least 30 minutes. In another embodiment, it is carried out for about 2 to 5 hours.

Once a molten mixture forms, the molten mixture can be placed in subatmospheric pressure conditions at a suitable temperature for a period of time that is sufficiently long for the molten mixture to polymerize into a PET-derived modified PBT polymer.

The subatmospheric conditions can include a pressure of less than 2 Torr, specifically less than 1 Torr. Advantageously, the molten mixture can be placed under subatmospheric conditions without isolation and dissolution of any material from the molten mixture. The temperature at which the molten mixture is placed under subatmospheric conditions is sufficiently high to promote polymerization of the polyethylene terephthalate and polybutylene terephthalate oligomers, 1,4-butane diol, and ethylene glycol to the PET-derived modified PBT ("elevated temperature"). Generally, the temperature is at least 220° C. In one embodiment, the temperature ranges from 220° C. to 275° C., specifically 240° C. to 270° C.

During the time when the molten mixture is placed under subatmospheric conditions and the temperature is increased, excess butanediol, ethylene glycol and THF can be removed from the reactor and oligomers allowed to build up molecular weight. Agitation can be continuously provided to facilitate the removal of the low boiling components. After sufficient molecular weight is obtained, the molten PBT polymer can be dropped from the reactor, cooled, stranded and chopped into pellets.

The duration of polymerization, discussed above (in which the molten mixture polymerizes from polyethylene terephthalate and polybutylene terephthalate oligomers, 1,4-butane diol, and ethylene glycol) can vary, depending on factors such as equipment available, production needs, desired final properties, and the like. In one embodiment, polymerization is carried out for at least two hours. In another embodiment, the step is carried out for at least 30 minutes, specifically from 2 to 5 hours.

The process for making a PET-derived modified PBT component can include reducing the amount of THF produced during the process by adding to the reactor, during polymerization, a basic compound, containing an alkali metal, or an epoxide. Such methods are disclosed in co-assigned U.S. Pat. Nos. 8,138,233 and 7,799,836, both hereby incorporated by reference in their entirety.

The process for making the PET-derived modified PBT may contain an additional stage in which the PBT formed from the molten mixture is subjected to solid-state polymerization. In one embodiment, polymerization of the molten depolymerized mixture is carried out under vacuum by subjecting the depolymerized mixture to vacuum under heat, optionally with distillation, at a pressure of less than 2 Torr and a temperature of 220° C. to 270° C. until an intrinsic viscosity of 0.4 to 0.6 is obtained and then initiating solid state polymerization at a temperature of 200° C. to 220° C.

Solid-state polymerization generally involves subjecting the modified PBT formed from the molten mixture to an inert atmosphere and heating to a temperature for a sufficient period of time to build the molecular weight of the modified PBT. Generally, the temperature to which the PBT is heated is below the melting point of the modified PBT, e.g., from 5° C. to 60° C. below the melting point of the modified PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the modified PBT to a suitable molecular weight. Such tumultuous conditions may be created by subjecting the modified PBT to tumbling, the pumping of inert gas into the system to promote fluidization of polymer particle, e.g., pellets, chips, flakes, powder and the like. The solid-state polymerization can be carried out at atmospheric pressure and/or under reduced pressure, e.g. from 1 atmosphere to 1 mbar.

By way of illustration, a titanium-containing catalyst can be made in accordance with the present process by reacting in situ a tetra($C_1$-$C_8$ alkyl) titanate such as tetraisopropyl titanate with a phosphorous-containing compound such as phosphoric acid, as shown in Scheme 2.

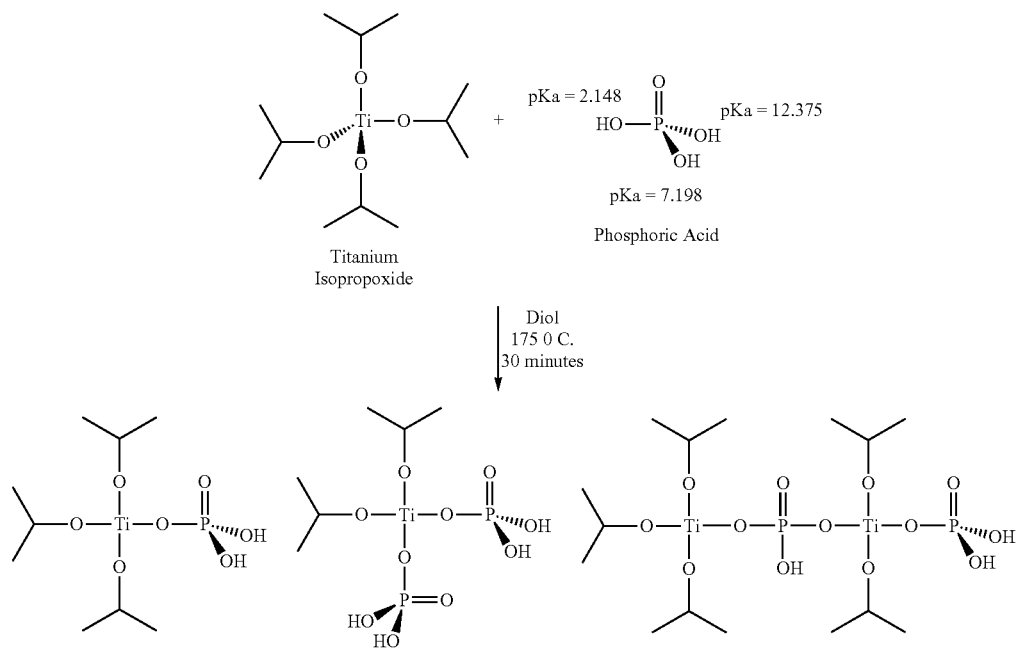

Scheme 2

The in-situ reaction between phosphoric acid and tetraisopropyl titanate in diol solvent (for example, butanediol) can achieve complete conversion in the reaction between the most acidic hydroxyl group of the phosphoric acid and tetraisopropyl titanate. Without wishing to be bound by theory, it is believed that once all strongly acidic hydroxyl groups are consumed, polymerization can be conducted without inhibition. After the catalyst preparation, the catalyst components and the polyethylene terephthalate can be introduced into a reactor and the reaction temperature can be increased, for example to 2200° C., to complete depolymerization and ester interchange, followed by polymerization, for example at 250° C.

In still another embodiment, the invention includes a process for making PTT (polytrimethylene terephthalate) that involves reacting a polyethylene terephthalate component with a 1,3-propanediol at a pressure that is at least atmospheric pressure in the presence of a catalyst component at a temperature ranging from 180° C. to 260° C., under an inert atmosphere, thereby depolymerizing the polyethylene terephthalate component into a molten mixture containing polyethylene terephthalate oligomers, polypropylene terephthalate oligomers, 1,3-propanediol, and ethylene glycol and/or combinations thereof. The polyethylene terephthalate component and the 1,3-propanediol can be combined in the molten phase under agitation and the 1,3 propanediol refluxed back into the reactor, thereby forming a PET-derived PTT.

The polyethylene terephthalate (PET) component of the process includes recycled (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants.

The process of preparing the polyalkylene terephthalate can be either a two-stage process in which the alkylene diol incorporated into the polyalkylene terephthalate is added for both the depolymerization and polymerization stages. Alternatively, a three-stage process in which in which a first dihydric alcohol is used for depolymerization and a second dihydric alcohol, wherein the first dihydric alcohol and second dihydric alcohol are different, is used for polymerization and incorporated into the polyalkylene terephthalate.

For example, in a three-stage process, the first dihydric alcohol can be any $C_2$-$C_4$ alkylene diol that reacts with the PET to depolymerize the polyethylene terephthalate. Examples of suitable first dihydric alcohols are alkylene diols that can include ethylene glycol, 1,2-propylene glycol, 1,3-propylene glycol, 1,2-butanediol, 2,3-butanediol, 1,4-butanediol, and combinations thereof. In one embodiment, the first dihydric alcohol is selected from 1,4-butanediol, 1,3-propanediol, ethylene glycol, and combinations thereof.

The second dihydric alcohol can be any $C_3$-$C_4$ alkylene diol that reacts with the product of depolymerization in the polymerization of the polyalkylene terephthalate. Examples of a suitable second dihydric alcohol can include 1,2-propylene glycol, 1,3-propylene glycol, 1,2-butanediol, 2,3-butanediol, and 1,4-butanediol. For example, the first alkylene diol can be 1,4-butanediol, 1,3-propanediol, ethylene glycol, or combinations thereof and the second alkylene diol can be diethylene glycol, 1,3-propanediol, 1,4-butanediol, or combinations thereof. In one embodiment of the process, the first dihydric alcohol and the second alkylene diol are different. For example, the first dihydric alcohol can be one or more alkylene diols that do not comprise butanediol and the second dihydric alcohol can be 1,4-butanediol.

For example, in a two-stage process of preparing a modified PBT, a 1,4-butane diol component can react with a polyethylene terephthalate starting material under conditions that depolymerize the polyethylene terephthalate, and a molten mixture of the depolymerized product can be placed under subatmospheric conditions to produce the modified polybutylene terephthalate random copolymer. In a three-stage reaction of preparing a modified PBT. a diol component selected from the group consisting of ethylene glycol, propylene glycol, and combinations thereof can react with a polyethylene terephthalate component under conditions sufficient to depolymerize the polyethylene terephthalate component into a first molten mixture; and the first molten mixture can be combined with 1,4-butane diol under conditions that creates a second molten mixture that is subsequently placed under subatmospheric conditions to produce a modified polybutylene terephthalate random copolymer.

The final modified polyalkylene terephthalate prepared by the process can be a modified poly(trimethylene terephthalate) derived from petroleum-derived 1,3-propanediol, a modified poly(trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the PET used and the reaction conditions. In one embodiment the aromatic dicarboxylic acid group contains from 0.2 to 3.0 mol % of isophthalic acid group and from 90 to 99 mol % percent of terephthalic acid groups, based on the total moles of diacid groups present in the copolymer. Specifically, at least 90 mol %, specifically at least 95 mol %, more specifically at least 98 mol % or about 0 mol %, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mol %, specifically at least 95 mol %, more specifically at least 98 mol % or about 0 mol %, of the diol groups in the modified polyalkylene terephthalate (specifically modified polybutylene terephthalate) are an alkylene diol group derived from the dihydric alcohol used in polymerizing the modified polyalkylene terephthalate.

The modified polyalkylene terephthalate prepared by the present process comprises the components of the titanium-containing catalyst. Thus, the modified polyalkylene terephthalate prepared by the present process comprises 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly phosphoric acid), phosphorus acid, monobutyl phosphate, dibutyl phosphate, monoalkyl phosphates, dialkyl phosphates. More specifically, the modified polyalkylene terephthalate prepared by the present process is modified PBT, which comprises 50 to 300 ppm of tetraisopropyl titanate and 100 to 600 ppm of phosphoric acid.

The modified polyalkylene terephthalate prepared by the present process can further comprise other residues present in the PET component, including catalyst residues from the manufacture of the PET, residues from additives in the PET, or residues arising from side reactions that occur during manufacture of the PET and/or the reaction of the first alkylene diol and the PET.

For example, residues derived from the polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the polyethylene terephthalate component can comprise one or more of ethylene glycol groups, diethylene glycol groups, and more particularly a combination of ethylene glycol groups and diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mol % and can range from 0 or 0.1 to 10 mol % (0 or 0.07 to 7 percent by weight). The PET-derived modified PBT component ordinarily contains ethylene glycol in an amount that is at least 0, 1 mol % and can range from 0.1 to 10 mole % (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mol % (0.04 to 4 wt. %). The amount of the butane diol groups is generally about 98 mol % and can vary from 95 to 99.8 mol % in some embodiments. The amount of the terephthalic acid groups is generally about 98 mol % and can vary from 90 to 99.9 mole % in some embodiments. Unless otherwise specified, all molar amounts of the isophthalic acid groups and or terephthalic acid groups in a polyester are based on the total moles of diacids/diesters in the composition. Unless otherwise specified, all molar amounts of the butane diol, ethylene glycol, and diethylene glycol groups are based on the total moles of diol in the composition.

The polyalkylene terephthalate prepared by the present process is a random polymer that can have a number average molecular weight of at least 10,000 g/mol, specifically at least 15,000 g/mol, and a polydispersity index from 2 to less than 6, specifically 2 to 5. In one embodiment, the modified polyalkylene terephthalate, specifically a modified PBT, has a melting temperature ($T_m$) ranging from 150 to 223° C., specifically 200 to 218° C., more specifically 204 to 210° C.

Specifically, recycled polyethylene terephthalate for use in the present process can be selected or characterized by any one or more, specifically all, of the following: an acetaldehyde content below 5 ppm, a moisture content below 0.5 percent by weight, a halogen (specifically Br and Cl) content below 10 ppm, an iron content less than 10 ppm, a DEG or isophthalate content less that 5 percent by weight, —COOH end groups in an amount below 70 meq/Kg resin, —OH end groups in an amount greater than 30 meq/Kg, a vinyl content less than 0.1%, and a PVC or PC content essentially absent (less that 10 ppm). The resulting product can be obtained and characterized by any one or more, specifically all, of the following: a $M_w$ of 10,000 to 70,000 (or IV of 0.4 to 0.9 dl/g), —COOH end groups in the amount of 5 to 40 meq/Kg resin, OH end groups in the amount of 10 to 70 meq/Kg resin, a Yellowness Index (YI) of 5.0 to 15.0, a phosphorous (P) content of 50 to 1000 ppm, a titanium (Ti) content of 10 to 200 ppm, a mole ratio of P to Ti of 4:1 to 1:1, cobalt in the amount of 10 to 100 ppm, and a DEG content in the polymer of 0.50 to 3.0 mole %.

In the present process, the final polyalkylene terephthalate can be a modified poly(trimethylene terephthalate) derived from petroleum-derived 1,3-propanediol, a modified poly (trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the PET used and the reaction conditions. In one embodiment the aromatic dicarboxylic acid group contains from 0.2 to 3.0 mol % of isophthalic acid group and from 90 to 99 mol % percent of terephthalic acid groups, based on the total moles of diacid groups present in the copolymer. Specifically, at least 90 mol %, specifically at least 95 mol %, more specifically at least 98 mol % or about 0 mol %, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mol %, specifically at least 95 mol %, more specifically at least 98 mol % or about 0 mol %, of the diol groups in the modified polyalkylene terephthalate (specifically modified polybutylene terephthalate) are an alkylene diol group derived from the dihydric alcohol used in polymerizing the modified polyalkylene terephthalate.

The polyalkylene terephthalate prepared by the present process can further comprise other residues present in the PET component, including catalyst residues from the manufacture of the PET, residues from additives in the PET, or residues arising from side reactions that occur during manufacture of the PET and/or the reaction of the first alkylene diol and the PET.

For example, residues derived from the polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the polyethylene terephthalate component can comprise one or more of ethylene glycol groups, diethylene glycol groups, and more particularly a combination of ethylene glycol groups and diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mol % and can range from 0 or 0.1 to 10 mol % (0 or 0.07 to 7 percent by weight). The PET-derived modified PBT component ordinarily contains ethylene glycol in an amount that is at least 0.1 mol % and can range from 0.1 to 10 mol % (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mol % (0.04 to 4 wt. %). The amount of the butane diol groups is generally about 98 mol % and can vary from 95 to 99.8 mol % in some embodiments. The amount of the terephthalic acid groups is generally about 98 mol % and can vary from 90 to 99.9 mole % in some embodiments. Unless otherwise specified, all molar amounts of the isophthalic acid groups and or terephthalic acid groups in a polyester are based on the total moles of diacids/diesters in the composition. Unless otherwise specified, all molar amounts of the butane diol, ethylene glycol, and diethylene glycol groups are based on the total moles of diol in the composition.

Advantageously, the present process for making PET-derived modified polyalkylene terephthalate can substantially reduce carbon dioxide emissions and solid waste. Since the modified polyalkylene terephthalate resin compositions made by the inventive process can be made from scrap PET and not monomers, the process can significantly reduce the amount of carbon dioxide emissions and solid waste. In contrast, the process to make DMT or TPA from crude oil is highly energy intensive and as a result, substantial emissions of $CO_2$ to the atmosphere can occur from burning of non-renewable energy sources. By not using DMT or TPA to make the PET-derived PBT, substantial carbon dioxide emissions savings can be obtained.

In one embodiment, a process for making PET-derived modified PBT can eliminate at least 1 kg of $CO_2$ emissions for every kilogram of PET-derived modified PBT made with the process, as compared to a process that makes virgin PBT homopolymers from monomers. Specifically, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of butanediol is from biomass derived, feedstocks such as succinic acid, the carbon dioxide savings can further increase. Furthermore, the fermentation to yield succinic acid requires carbon dioxide as an input, therefore leading to further carbon dioxide reductions.

Accordingly, the present process can produce a modified polybutylene terephthalate random copolymer having a reduced $CO_2$ emissions index, defined as the amount of $CO_2$, expressed in kg, that is saved when one kg of a composition containing the modified polybutylene terephthalate random copolymers is made, as compared to the amount of $CO_2$, expressed in kg, that is created when the composition is made with polybutylene terephthalate that is derived from monomers. Generally, the modified PBT random copolymers made by the present process can have a reduction in $CO_2$ emissions index that is more than approximately 1.3 kg and can range from 1.3 kg to 2.5 kg.

In one embodiment, the present process is used to prepare a modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The modified polyalkylene terephthalate typically has a number average molecular weight of at least 15,000 g/mol, specifically 20,000 to 200,000 g/mol) and a polydispersity index from 2 to less than 6, specifically 2 to 5. In such an embodiment, the modified polyalkylene terephthalate, specifically the modified PBT, has a melting temperature ($T_m$) ranging from 150° C. to 223° C., specifically 2000° C. to 218° C., more specifically 204° C. to 210° C. The molecular weight can be obtained using polystyrene standards, as measured by gel permeation chromatography in chloroform/hexafluoroisopropanol (5:95, volume/volume ratio) at 25° C.

In one embodiment, the modified polyalkylene terephthalate is a modified polybutylene terephthalate (PBT) containing 50 to 300 ppm of tetra($C_1$-$C_8$ alkyl) titanate and 100 to 600 ppm of a phosphorous containing compound, both based on the total amount of titanium present, wherein the phosphorous containing compound which is phosphoric acid. The modified PBT typically has an intrinsic viscosity (as measured in phenol/tetrachloroethane (60:40, volume/volume ratio) at 25° C.) of 0.4 to 2.0 deciliters per gram. In one embodiment, the PBT resin has an intrinsic viscosity of 0.6 to 1.4 dl/g.

The modified PBT is typically prepared in a pilot plant by reacting polyethylene terephthalate with 1,4-butanediol in the presence of the catalyst described herein. The ratio of the catalyst components (PA:TPT) is typically in the range of 0.15:1 to 0.9:1. The resin is produced via a melt polymerization/solid state polymerization process, wherein melt polymerization involves batch processing (including catalyst preparation), depolymerization, transesterification and polycondensation. Typically a particular IV is targeted for the product obtained from melt polymerization. In one embodiment, the targeted IV is from 0.7-0.9 dL/g. The melt polymerization product is subsequently subjected to solid state polymerization. Typically, a particular IV is targeted for the product obtained from solid state polymerization. In one embodiment, the targeted IV is from 1.0-1.3 dL/g.

Melt Polymerization.

More specifically, melt polymerization is carried out in a pilot plant equipped with a single batch reactor, and involves four steps: in-situ catalyst preparation, depolymerization of recycled PET (rPET), ester interchange (EI), and polymerization. First, ethylene glycol (EG) and phosphoric acid (the amount used depends on the titanium catalyst concentration) are charged into the reactor and the reactor temperature is raised to 120° C. at atmospheric pressure (approximately 1050 mbar). The mixture is held at this temperature and atmospheric pressure for 30 minutes to remove moisture. The calculated amount of titanium isopropoxide to achieve a concentration of 115 ppm of Ti based on the polymer weight is then added into the reactor and the reactor temperature is raised to 170° C. The mixture is held at 170° C. for 70 minutes.

Recycled PET (rPET) is then charged into the reactor (rPET:EG=1:1.5 mol). The reactor temperature was then increased to 225° C. and the pressure was set to 3.5 mbar (2.6 Torr). Depolymerization of rPET to bis-hydroxy ethyl terephthalate (BHET) was completed in 90 minutes by holding the mixture at these conditions. After completion of depolymerization, the reactor is depressurized to 1050 mbar (787 Torr). Next, in the transesterification step, BDO (rPET:BDO=1:3.6 mol ratio) is added to the reactor and the reactor temperature is maintained at 225° C. to complete atmospheric distillation until the column top temperature dropped. A vacuum of 700 mbar (525 Torr) is applied gradually in the transesterification step to remove EG while maintaining the reactor temperature at 225° C. for 30 minutes and the overhead line temperature at 180° C. which allows BDO reflux back into the reactor. EG and BDO are collected as overheads during the transesterification step.

The batch is held at these conditions until the column top temperature drops to 130° C. In the polymerization step, the reactor temperature is increased to 240° C. and a vacuum is applied by gradually reducing the pressure to approximately 1 mbar (0.757 Torr), to remove excess BDO, THF, and EG as overheads. After stabilizing the vacuum at approximately 1 mbar and the reactor temperature between 240 and 250° C., the torque in the reactor is monitored until achieving the required intrinsic viscosity (IV) (between 0.7 and 0.8 dL/g). Finally, the polymer melt is drained and then pelletized.

Solid State Polymerization.

In order to get a high value of IV (1.17-1.25 dL/g) for the resin prepared from rPET, low viscosity resins obtained from melt polymerization are subjected to solid state polymerization in a tumbling reactor at 100 mbar (75 Torr) pressure at a temperature of 200° C. for about 18 to 30 h. The IV is checked intermittently during the viscosity build-up and a product with a final IV value of 1.25 is obtained.

In another aspect, the invention is directed to a modified polyalkylene terephthalate prepared by from recycled polyethylene terephthalate by a melt polymerization process comprising:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid: tetraisopropyl titanate molar ratio of 0.1:1 to 1.2:1;

forming a catalyzed reactant mixture by combination the catalyst solution with polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture;

subjecting the depolymerized mixture to heat to melt residual particles of polyethylene terephthalate at an elevated third temperature higher than the second temperature to obtain a molten depolymerized mixture;

polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and stopping the polymerization when obtaining a modified polybutylene terephthalate having a number average molecular weight of at least 15,000 g/mol.

In another aspect, the invention is directed to a modified polyalkylene terephthalate prepared by from recycled polyethylene terephthalate by a melt polymerization process comprising:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid: tetraisopropyl titanate molar ratio of 0.1:1 to 1.2:1;

forming a catalyzed reactant mixture by combination the catalyst solution with polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture;

subjecting the depolymerized mixture to heat to melt residual particles of polyethylene terephthalate at an elevated third temperature higher than the second temperature to obtain a molten depolymerized mixture;

polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and subjecting the polymerized mixture to solid state polymerization at approximately 100 mbar (75 Torr) pressure and a temperature of approximately 200° C. for about 18 to 30 h to obtain a modified polybutylene terephthalate.

Composition

The modified polyalkylene terephthalate prepared by the present process can be blended with other components to obtain a thermoplastic compositions. Substances can be added to the modified polyalkylene terephthalate to impart desirable properties in the resulting compositions. Additives are ordinarily incorporated into polymer compositions with the understanding that the additives are selected so as to not significantly adversely affect the desired properties of the composition, for example, impact, flexural strength, color, and the like. Such additives can be mixed at a suitable time during the mixing of the components for forming the composition. Possible additives include reinforcing agents, impact modifiers, fillers, reinforcing agents, anti-oxidants, heat stabilizers, light stabilizers, ultraviolet light (UV) absorbers, plasticizers, lubricants, mold release agents, anti-static agents, colorants, blowing agents, flame retardants, anti-drip agents, nucleating agents, and radiation stabilizers. Additives are described, for instance, in the *Plastics Additives Handbook* Hans Zweifel, Ed. (6$^{th}$ ed. 2009).

Combinations of additives such as antioxidants, UV absorbers, and mold release agents, can be used. The total amount of additives (other than any impact modifier, filler, or reinforcing agents) is generally 0.01 to 15 percent by weight, based on the total weight of the composition.

In a specific embodiment, from 0.01 to 5.00 percent by weight of an additive selected from the group consisting of a nucleating agent, an antioxidant, a UV stabilizer, a plasticizer, and a melt strength additive, or a combination thereof, is used. For example, a stabilizer component is optionally present in the modified polyalkylene terephthalate resin composition, in an amount from more than 0 to 3 percent by weight, specifically 0.001 to 2 percent by weight, even more specifically 0.005 to 1.5 percent by weight. As used herein, a "stabilizer" is inclusive of an antioxidant, thermal stabilizer, radiation stabilizer, ultraviolet light absorbing additive, and the like, and combinations thereof. In one embodiment, the stabilizer component comprises an antioxidant.

The invention described herein provides for a thermoplastic composition that is characterized by the absence of a catalyst quencher such as an acid interchange quencher. Thus, the present invention can be further characterized by the excluding (not adding) a catalyst quencher, or means for quenching the catalyst, in the thermoplastic composition containing the modified polyalkylene terephthalate resin composition.

As indicated previously, quenchers are agents that inhibit activity of any catalysts that can be present in a resin composition to prevent an accelerated interpolymerization and degradation of the thermoplastic. Such quenchers can be selected from the group consisting of acidic phosphate salts, acid phosphites, alkyl phosphites, aryl phosphites, mixed phosphites and combinations thereof, specifically an acidic phosphate salt; an acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The acidic phosphate salts include sodium dihydrogen phosphate, mono zinc phosphate, potassium hydrogen phosphate, calcium dihydrogen phosphate and the like. Most preferred quenchers are phosphoric acid, phosphorous acid or their partial esters such as mono zinc phosphate. Specifically, quenchers can include zinc phosphate, monozinc phosphate, phosphorous acid, phosphoric acid diluted in water, sodium acid pyrophosphate, tetrapropylorthosilicate, tetrakis-(2-methoxyethoxy)silane, sodium lauryl sulphate, boric acid, citric acid, oxalic acid, a cyclic iminoether containing compound, and combinations thereof.

The thermoplastic composition prepared from the modified polyalkylene terephthalate can also comprise at least one reinforcing filler. For example reinforcing filler can comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. In one embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, can also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 6-24 µm, specifically 8-18 µm is impregnated with melted PBT polyester. After cooling, the impregnated bundle is cut into pellets having a length of >5 mm, specifically, above >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention, to get long fiber glass-reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the modified polyalkylene terephthalate and then fed to an extruder and the extrudate cut into pellets, or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications it may be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, is present in the composition in an amount from 1 to 60 percent by weight, or 5 to 50 percent by weight, specifically from 10 to 45 percent by weight, more specifically from 20 to 40 percent by weight, and most specifically, from 25 to 35 percent by weight.

In still other embodiments, the compositions can optionally additionally comprise a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, the reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

In addition to the reinforcing, the thermoplastic composition can optionally comprise a stabilizer. Many stabilizers are known and are commercially available. In one embodiment, the thermoplastic composition further comprises 0.01 to 1 percent by weight of a stabilizer. In a particular embodiment, the stabilizer pentaerythritol-tetrakis(3-(3,5-di-tert.butyl-4-hydroxy-phenyl-) propionate), CAS Reg. No. 6683-19-8, which is available from BASF Corp. More particularly, about 0.02 to 0.08 percent by weight of pentaerythritol-tetrakis(3-(3,5-di-tert.butyl-4-hydroxy-phenyl-) propionate) is present in the thermoplastic composition of the invention. More particularly, about 0.03 to 0.07 percent by weight of pentaerythritol-tetrakis(3-(3,5-di-tert.butyl-4-hydroxy-phenyl-) propionate) is present in the thermoplastic composition of the invention.

In addition to the reinforcing filler and stabilizer, the thermoplastic composition can optionally further comprise an impact modifier. Many impact modifiers are known and are commercially available. In one embodiment, the thermoplastic composition comprises 0.0 to 20 percent by weight of an impact modifier. In a particular embodiment, the impact modifier is linear low density polyethylene (LLDPE). More particularly, about 1 to 10 percent by weight of LLDPE is present in the thermoplastic composition of the invention. More particularly, about 2 to about 8 percent by weight of LLDPE is present in the thermoplastic composition of the invention.

In addition to the above-described additives, used accessorily in a small amount, depending on the object, other polymers or resins, typically in an amount less than 50 weight percent, specifically less than 30 percent by weight, more specifically less that 20 percent by weight, of the total composition, can be added to the thermoplastic resin composition containing the modified polybutylene terephthalate. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to the reinforcing filler, stabilizer, and impact modifier. The thermoplastic composition can optionally comprise other additives. In addition to modified polyalkylene terephthalate, other polyesters can optionally be present in the composition (in an amount of less than 50 weight percent, specifically less than 30 percent by weight, more specifically less that 20 percent by weight, most specifically less than 10 percent by weight of the total composition, provided that such polyesters do not significantly and adversely affect the desired properties of the composition.

For example, a thermoplastic composition can include, in addition to the modified polybutylene terephthalate prepared by the present process other aromatic polyesters, cycloaliphatic polyesters, and the like. The additional polyesters can be virgin polyesters or wholly or partially bio-derived, including petroleum-derived aromatic polyesters and bio-derived aromatic polyesters.

In one embodiment, the thermoplastic composition, comprises from 50 to 99.99 percent by weight of a modified polyalkylene terephthalate, wherein the modified polyalkylene terephthalate contains containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; from 0 to 60 percent by weight of a reinforcing filler which is glass;

wherein essentially no quencher for the catalyst complex is added to the compounded thermoplastic composition; and wherein the weight percents are based on the total weight of the composition.

In another embodiment, the thermoplastic composition, comprises:

from 50 to 99.99 percent by weight of a modified polyalkylene terephthalate, wherein the modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 0 to 60 percent by weight of a reinforcing filler which is glass;

from 0 to 30 percent by weight of an impact modifier; and from 0 to 5 percent by weight of an additive selected from a nucleating agent, antioxidant, UV stabilizer, plasticizer, epoxy compound, melt strength additive, or a combination thereof, crosslinkers, and combinations thereof; and wherein essentially no quencher for the catalyst complex is added to the compounded thermoplastic composition; and wherein the weight percents are based on the total weight of the composition.

In another embodiment, the thermoplastic composition, comprises:

from 50 to 99.99 percent by weight of a modified polyalkylene terephthalate, wherein the modified polyalkylene terephthalate containing 50 to 300 ppm of tetra($C_1$-$C_8$ alkyl) titanate and 100 to 600 ppm of a phosphorous containing compound, both based on the total amount of titanium present, wherein phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 0 to 60 percent by weight of a reinforcing filler which is glass;

from 0 to 1 percent by weight of a stabilizer;

from 0.01 to 20 percent by weight of an impact modifier; and wherein essentially no quencher for the catalyst complex is added to the compounded thermoplastic composition; and wherein the weight percents are based on the total weight of the composition.

In these and other embodiments, essentially no quencher for the catalyst complex is added to the compounded thermoplastic composition.

In another embodiment, the thermoplastic composition, comprises:
from 50 to 99.99 percent by weight of a modified polybutylene terephthalate, wherein the modified polyalkylene terephthalate contains 50 to 300 ppm of tetraisopropyl titanate and 100 to 600 ppm of phosphoric acid;
from 1 to 60 percent by weight of a reinforcing filler which is glass;
from 0.01 to 1 percent by weight of a stabilizer;
from 1 to 10 percent by weight of an impact modifier; and
wherein essentially no quencher for the catalyst complex is added to the compounded thermoplastic composition; and
wherein the weight percents are based on the total weight of the composition.

In another embodiment, the thermoplastic composition, comprises:
from 50 to 99.99 percent by weight of a modified polybutylene terephthalate, wherein the modified polyalkylene terephthalate contains 50 to 300 ppm of tetraisopropyl titanate and 100 to 600 ppm of phosphoric acid;
from 5 to 50 percent by weight of a reinforcing filler which is glass;
from 0.02 to 0.08 percent by weight of a stabilizer;
from 1 to 10 percent by weight of an impact modifier; and
wherein essentially no quencher for the catalyst complex is added to the compounded thermoplastic composition; and
wherein the weight percents are based on the total weight of the composition.

In another embodiment, the thermoplastic composition comprises:
from 50 to 99.99 percent by weight of a modified polybutylene terephthalate containing 50 to 300 ppm of tetraisopropyl titanate and 100 to 600 ppm of phosphoric acid;
from 25 to 35 percent by weight of a reinforcing filler which is glass;
from 0.03 to 0.07 percent by weight of a stabilizer;
from 2 to 8 percent by weight of an impact modifier, and
wherein essentially no quencher for the catalyst complex is added to the compounded thermoplastic composition; and
wherein the weight percents are based on the total weight of the composition.

In another embodiment, the thermoplastic composition comprises:
from 50 to 70 percent by weight of a modified polybutylene terephthalate containing 50 to 300 ppm of tetraisopropyl titanate and 100 to 600 ppm of phosphoric acid;
from 25 to 35 percent by weight of a reinforcing filler which is glass;
from 0.03 to 0.07 percent by weight of a stabilizer;
from 2 to 8 percent by weight of an impact modifier; and
wherein essentially no quencher for the catalyst complex is added to the compounded thermoplastic composition; and
wherein the weight percents are based on the total weight of the composition.

In the embodiments of the invention described herein, it is preferable that no chain extender is added to the compounded thermoplastic composition. Chain extenders are widely known in the art and include epoxy chain extenders such as 3,4-Epoxycyclohexylmethyl-3',4'-epoxycyclohexane carboxylate. Thus, in a particular embodiment, the invention is directed to a thermoplastic composition with improved hydrostability, comprising:
50 to 99.99 percent by weight of a modified polyalkylene terephthalate containing 50 to 300 ppm of tetra($C_1$-$C_8$ alkyl) titanate and 100 to 600 ppm of a phosphorous contains compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and
0 to 60 percent by weight of a reinforcing filler;
wherein all weight percents are based on the total weight of the composition;
wherein no chain extender is added to the compounded thermoplastic composition; and
wherein no quencher for the catalyst complex is added to the compounded thermoplastic composition.

In another aspect, the invention is directed to a modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. In one embodiment of this aspect, the modified polyalkylene terephthalate is polybutylene terephthalate or a mixture of polybutylene terephthalates. In another embodiment, the modified polyalkylene terephthalate is polybutylene terephthalate prepared from recycled polyethylene terephthalate. In a further embodiment, the tetra($C_1$-$C_8$ alkyl) titanate is tetraisopropyl titanate and the phosphorous containing compound is phosphoric acid A thermoplastic composition comprising the modified polyalkylene terephthalate as described herein can be prepared by blending the components of the thermoplastic composition employing a number of procedures. In an exemplary process, the thermoplastic composition comprising a modified polyalkylene terephthalate prepared according to the present process, an optional reinforcing filler, and any optional other polymers or additives are placed into an extrusion compounder to produce molding pellets. The components are dispersed in a matrix in the process. In another procedure, the components and reinforcing filler are mixed by dry blending, and then fluxed on a mill and comminuted, or extruded and chopped. The thermoplastic composition can also be mixed and directly molded, e.g., by injection or transfer molding techniques. Specifically, all of the components are freed from as much water as possible. In addition, compounding is carried out to ensure that the residence time in the machine is short; the temperature is carefully controlled; the friction heat is utilized; and an intimate blend between the components is obtained.

The components of the thermoplastic composition can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions capable of insert molding.

Thus, in another aspect, the invention is directed to a process for forming a thermoplastic composition as described herein by blending, based on the total weight of the thermoplastic composition, the following:

from greater than 50 to 99.9 percent by weight of polyalkylene terephthalate resin composition prepared by as described herein;

from 0 to 50 percent by weight of filler;

from 0 to 30 percent by weight of an impact modifier;

from 0 to 5 percent by weight of at least one additive selected from the group consisting of a nucleating agent, antioxidant, UV stabilizer, plasticizer, epoxy compound, melt strength additive, crosslinker, and combinations thereof, wherein no means for quenching the catalyst contained in the a polyalkylene terephthalate resin composition is added to the compounded thermoplastic composition; and extruding, calendaring, extrusion molding, blow molding, solvent casting, or injection molding the thermoplastic composition.

Advantageously, useful articles can be made from the polyalkylene terephthalate made according to the process described herein or thermoplastic compositions comprising the modified polyalkylene terephthalate. In a specific embodiment, an article is extruded, calendared, or molded, for example blow molded or injection molded from the modified polyalkylene terephthalate or composition containing the polymer. The article can be a film or a sheet. When the article is a film, the article can be formed by extrusion molding or calendaring the modified polyalkylene terephthalate or thermoplastic composition containing the polyester.

The thermoplastic compositions made from the present process provide product lines that have superior hydrolytic stability. In particular, such thermoplastic compositions can provide improved hydro and heat resistance in abusive molding and outdoor application.

As stated above, various combinations of the foregoing embodiments can be used.

The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof. The examples are annotated as "E." and comparative examples are annotated hereinafter as "CE", employed the materials listed in Table 1. The invention is further described in the following illustrative examples in which all parts and percentages are by weight unless otherwise indicated.

TABLE 1

| Component | Trade Name and Supplier |
|---|---|
| BDO | 1,4-Butanediol, CAS Reg. No. 110-6304, from BASF. |
| PA | Phosphoric Acid CAS Reg. No. 7664-38-2, from Acros. |
| TPT | Tetraisopropyl titanate, CAS Reg. No. 546-68-9, from DuPont, commercial Tyzor grade |

TABLE 1-continued

| Component | Trade Name and Supplier |
|---|---|
| DMT | Dimethyl Terephthlate, CAS Reg. No. 120-61-6., from Invista |
| PE-I | Polybutylene Terephthalate (PBT) sold by SABIC Innovative Plastics as VALOX ® 315 with an intrinsic viscosity of 1.2 cm³/g as measured in a 60:40 phenol/tetrachloroethane. |
| PE-II | Modified Polybutylene Terephthalate (PBT) prepared as described in Part C, below. |
| PBT Glass | ChopVantage ® HP 3770: Chopped 13-micron diameter fiberglass for use with PBT, obtained from PPG Ind. |
| LLDPE | Linear low density polyethylene, from Nova Chemicals, Corp. |
| Hindered Phenol Stabilizer | Pentaerythritol-tetrakis(3-(3,5-di-tert.butyl-4-hydroxy-phenyl-)propionate), CAS Reg. No. 6683-19-8, available from BASF Corp. |
| Sodium Stearate | CAS Reg. No. 822-16-2, obtained as Sodium Stearate T-1 from Chemtura Corp. |
| Chain Extender | 3,4-Epoxycyclohexylmethyl-3',4'-epoxycyclohexane carboxylate, CAS Reg. No. 2386-87-0, available as Celloxide 2021P from Daicel Chemical Industries. |
| Recycled PET | Obtained from Futura Polyesters Ltd. |

As indicated in Table 1, recycled PET was obtained from Futura Polyesters, Ltd. The recycled polyester was prepared for processing as follows. The post-consumer PET scrap or bottle scrap were collected and hydraulically compressed in the form of bales. The bales were then transported to cleaning sites. De-baling was achieved using hot water, enabling the bottles to loosen up from the tightly compressed bales to free bottles. Additionally, subjecting the bottles to hot water loosened stickers from the bottles. Any polyvinyl chloride bottles turned milky white post the hot water wash and were removed. The sorted (clear) bottles were ground to flakes of 3 mm to 5 mm size. The flakes were then subject to hydro-flotation. In hydro-flotation, polypropylene and paper were removed from PET flakes by density separation. The clean PET flakes were alkali washed to remove any glue. The PET flakes were subjected to two cycles of process-water wash and one cycle of washing using demineralized water. The clean flakes were then dried and bagged.

Extrusion, Molding, and Testing

For the compositions disclosed herein, ingredients were tumble blended and then extruded on 27 mm twin-screw extruder with a vacuum vented mixing screw, at a barrel and die head temperature between 240 to 265° C. and a 300 rpm screw speed. The extrudate was cooled through a water bath prior to pelletizing. ASTM tensile, Izod and flexural bars were injection molded on a van Dorn molding machine with a set temperature of approximately 240-265° C. The pellets were dried for 3-4 hours at 120° C. in a forced air-circulating oven prior to injection molding.

Notched and un-notched Izod testing was done on 75 mm×12.5 mm×3.2 mm bars using ASTM method D256 at both 23° C. and −30° C. using 5 lbf/ft pendulum energy.

Tensile properties were measured according to ASTM D 638 at 23° C. and 50 mm/min speed for 5 mm/min for the examples tested.

Flexural properties were tested per ASTM D790 with 3.2 mm thickness specimen and 1.27 mm/min speed.

Specific gravity was measured per ASTM D792.

Vicat softening temperature was tested per ASTM D1525 with 10 N load and 50° C./Hour temperate rate. Vicat temperature was tested on both regular molded examples as well as abusively molded examples. Abusive molding here refers to molding conditions that have 15° C. higher barrel temperature and double dwelling time than regular molding.

Heat deflection temperature (HDT) was tested per ASTM D648 with 1.82 MPa stress on 3.2 mm thickness specimens.

Melt volume-flow rate (MVR) was tested per ASTM D1238 at 250° C. with 5 kg load and 240 s dwell time.

Melt viscosity was determined as a function of time at 265° C. for 30 minutes. This test is also known as "time-sweep". Percent viscosity change was reported.

Hydrostability Tensile and Izod bars were aged in a pressure cooker at 110° C. and 100% relative humidity. Izod and tensile performance of the specimens were measured after 1 day, 2 days, and 5 days 9 days in the pressure cooker.

$^1$H NMR spectroscopy allowed confirmation of the structures of the polymers synthesized. Polymer samples were first dissolved in a 70/30 mixture of deuterated TFA/chloroform and then subjected to $^1$H for compositional analysis.

Differential scanning calorimetry (DSC) analysis was conducted on all examples with a ramp rate of 20° C./min and temperature range of 40 to 300° C.

Color (L*, a*, and b*) values were obtained through the diffuse reflectance method using a Gretag Macbeth Color-Eye 7000A with D65 illumination.

The intrinsic viscosity (IV) of the polymer was measured using an automatic Viscotek Microlab® 500 series Relative Viscometer Y501. In a typical procedure, 0.5000 g of polymer sample was fully dissolved in a 60/40 mixture (by vol) of % phenol/1,1,2,2-tetrachloroethane solution (Harrell Industries). Two measurements were taken for each sample, and the result reported was the average of the two measurements.

Carboxylic acid end group concentration was measured through manual titration. The sample resin was dissolved in phenol and dichlorobenzene solvents. Potassium hydroxide in methanol was used as titrant and bromo phenol blue was used as indicator. The analysis was conducted under room temperature and end point color is blue.

Titanium and phosphorous concentrations were obtained from elemental analysis using inductive coupling plasma (ICP) microwave method to confirm the molar ratio of catalyst reactants, TPT and HP.

Part A. Lab Scale Preparation of Modified PBT from Recycled PET

Comparative Example 1 (CE-1)

PBT was prepared on a lab scale from recycled PET and 1,4-butandiol (BDO) using a 1-L 3-necked round bottom flask equipped with a condenser and a vacuum output. A 86.4 g amount of recycled PET and 140 g of BDO were introduced into a three-neck round bottom flask. The reactor was placed in an oil bath temperature of 170° C. Then, 250 ppm of TPT was added to the reaction mixture, and the ester interchange temperature was increased to 220° C. at a rate of 2° C./min while stirring at 260 rpm under nitrogen. After waiting 40 minutes for depolymerization and the ester interchange to occur, the temperature of the reaction mixture was increased further to 250° C. Polymerization was initiated with the vacuum adjusted to below 1 Torr for 1 hour. The polymerization was stopped after achieving the desired intrinsic viscosity.

Example 2 (E-2)

Modified PBT was prepared on a lab scale from recycled PET and 1,4-butandiol (BDO) in the presence of a phosphorous-containing catalyst prepared in situ through the complexation between TPT and phosphoric acid in a 1:0.3 molar ratio. First, 50 g of BDO and 0.15 ml of phosphoric acid solution in water (0.1 g/ml) were introduced into a three neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization ceased, the temperature of the reaction mixture was further increased to 250° C. to melt the residual PET flakes completely. Polymerization was initiated with vacuum adjusted to below 1 Torr for 40 minutes. The polymerization was stopped after achieving the desired intrinsic viscosity.

Example 3 (E-3)

Modified PBT was prepared on a lab scale from recycled PET and 1,4-butandiol (BDO) using a catalyst was prepared in situ by the reaction between TPT and phosphoric acid in a 1:0.6 molar ratio. First, 50 g of BDO and the phosphoric acid solution (0.1 g/ml in water), to provide the necessary ratio, were introduced into a three neck round bottom flask. The reactor was placed in an oil bath at a temperature of 175° C. After 20 minutes, 250 ppm of TPT was added to the reactor, and an in situ complexation between phosphoric acid and TPT was carried out for 40 minutes under a $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization is completed and ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 4 (E-4)

Modified PBT was prepared one lab scale from recycled PET, and 1,4-butandiol (BDO) using catalyst that was prepared in situ by the reaction between TPT and phosphoric acid in 1:1 molar ratio. First, 50 g of BDO, phosphoric acid solution (0.1 g/ml in water), to obtain the indicated molar ratio, were introduced into a three-neck round bottom flask, which was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET, and 80 g of additional BDO were introduced into the catalyst solution, and the ester interchange temperature was increased to 220° C. at a rate of 2° C./min while stirring at 260 rpm under nitrogen. After the completed depolymerization ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 5 (E-5)

Modified PBT was prepared on a lab scale from recycled PET and 1,4-butandiol (BDO) using catalyst prepared in situ by the reaction between TPT and phosphoric acid in a 1:1.2 molar ratio. First, 50 g of BDO) and phosphoric acid solution (0.1 g/ml in water), to obtain the indicated molar ration, were introduced into a three-neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under nitrogen atmosphere. Then, 87.4 g of PET and 80 g of additional BDO were introduced into the catalyst solution and the ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving desired intrinsic viscosity.

Example 6 (E-6)

Modified PBT was prepared on a lab scale from recycled PET and 1,4-butanediol (BDO) in which the catalyst was prepared in situ by the reaction between TPT and phosphoric acid in a 1:1.5 molar ratio. First, 50 g of BDO and phosphoric acid solution (0.1 g/ml in water) were introduced into a three-neck round bottom flask. The reactor was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET and 80 g of additional BDO were introduced into the catalyst solution, and the ester interchange temperature was increased to 220° C. with a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving desired intrinsic viscosity.

Example 7 (E-7)

Modified PBT was prepared on a lab scale from recycled PET and 1,4-butanediol (BDO) in which the catalyst was prepared in situ by the reaction between TPT and phosphoric acid in a 1:2 molar ratio. First, 50 g of BDO and phosphoric acid solution in water (0.1 g/ml), to obtain the indicated molar ratio, were introduced into a three neck round bottom flask that was placed in an oil bath at a temperature of 175° C. After 20 minutes, 250 ppm of TPT was added to the reactor, and an in situ complexation between phosphoric acid and TPT was carried for 40 minutes under a nitrogen atmosphere. Then, 87.4 g of PET and 80 g of additional BDO were introduced into the catalyst solution. The ester interchange temperature was increased to 220° C. at a rate of 2° C./min while stirring at 260 rpm under the nitrogen. After the completed depolymerization ceased, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 8 (E-8)

Modified PBT was prepared on a lab scale from recycled PET and 1,4-butanediol (BDO) using catalyst prepared in situ by the reaction between TPT and phosphoric acid in a 1:3 molar ratio. First, 50 g of BDO and the requisite amount of phosphoric acid solution in water (0.1 g/ml) to obtain the indicated molar ratio were introduced into a three-neck round bottom flask. The reactor was placed in an oil bath at a temperature of 175° C. After 20 minutes, 250 ppm of TPT was added to the reactor. An in situ complexation between phosphoric acid and TPT was carried out for 40 minutes under nitrogen atmosphere. Then, 87.4 g of PET and 80 g of additional BDO were introduced into the catalyst solution. The ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated and carried out with the vacuum adjusted to below 1 Torr for 40 minutes. The polymerization was stopped after achieving the desired intrinsic viscosity.

The modified PBT resins prepared in Examples 1-8 were tested and results shown in Table 2 below.

TABLE 2

| Ex. | Phosphoric Acid/TPT | TPT (ppm) | IV (dL/min) | $T_m$ (° C.) | PDI | Mn | Mw |
|---|---|---|---|---|---|---|---|
| CE-1 | 0 | 250 | 0.976 | 216 | 2.8 | 32000 | 89000 |
| E-2 | 0.3 | 250 | 0.905 | 220 | 2.8 | 31000 | 86000 |
| E-3 | 0.6 | 250 | 0.725 | 219 | 2.6 | 24000 | 63000 |
| E-4 | 1 | 250 | 0.791 | 216 | 2.8 | 25000 | 69000 |
| E-5 | 1.2 | 250 | 0.848 | 218 | 3.1 | 27000 | 63000 |
| E-6 | 1.5 | 250 | 0.661 | 209 | 2.6 | 22000 | 57000 |
| E-7 | 2 | 250 | 0.618 | 181 | 2.5 | 22000 | 55000 |
| E-8 | 3 | 250 | 0.202 | 119 | 2.2 | 4900 | 11000 |

Table 2 summarizes the intrinsic viscosity, melting temperature, and molecular weight of the resin samples described in Examples 1-8, prepared by a polycondensation reaction between PET and BDO. Example C-1 represents the control. Examples 2 to 8 were synthesized with an situ catalyst according to the present process. The phosphoric acid to TPT molar ratios given Table 1 are the calculated molar ratios based on the amounts used for the catalyst preparation.

A strong correlation was found between the IV and number average molecular weight results for the resins. The present process enables high molecular weight polyester and IV up to 1.2 molar ratio between phosphoric acid and TPT (Examples 2-5). Above this ratio, the IV and molecular weight of the PBT resin started decreasing gradually. At the molar ratio of 3, the polymerization resulted in oligomers.

As analyzed, the backbone compositions of the PBT prepared in the comparative Example C-1 and Examples 2-8 prepared in the presence of TPT and phosphoric acid are shown in Table 3.

TABLE 3

| Ex. | Phosphoric Acid/TPT | Catalyst Amount (ppm) | Isophthalic (mol %) | Terephthalic (mol %) | EG (mol %) | BDO (mol %) |
|---|---|---|---|---|---|---|
| CE-1 | 0 | 250 | 1.0 | 49.7 | 1.4 | 48.0 |
| E-2 | 0.3 | 250 | 1.0 | 49.6 | 1.1 | 48.3 |
| E-3 | 0.6 | 250 | 1.0 | 49.5 | 1.5 | 48.0 |
| E-4 | 1 | 250 | 1.0 | 49.6 | 1.9 | 47.5 |
| E-5 | 1.2 | 250 | 1.0 | 49.8 | 1.4 | 47.8 |
| E-6 | 1.5 | 250 | 1.0 | 49.9 | 4.9 | 44.1 |

TABLE 3-continued

| Ex. | Phosphoric Acid/TPT | Catalyst Amount (ppm) | Isophthalic (mol %) | Terephthalic (mol %) | EG (mol %) | BDO (mol %) |
| --- | --- | --- | --- | --- | --- | --- |
| E-7 | 2 | 250 | 1.0 | 50.3 | 17.6 | 31.1 |
| E-8 | 3 | 250 | 0.9 | 50.2 | 22.1 | 26.9 |

Table 3 above summarizes the backbone chemical composition of the resin, based on $^1$H NMR analysis. Since recycled PET was used as a monomer feedstock, the introduction of comonomer impurities such as isophthalic and ethylene glycol (EG) moieties was inevitable. (The ethylene glycol (EG) content within the PBT backbone can be varied depending on the vacuum condition, i.e., process parameters.) A 1 mol % of isophthalic moieties within in the backbone was found to not change the crystallinity and melting temperature of the resin drastically.

The EG content was found to stay under 2 mol % up to a molar ratio of 1.2. Above this molar ratio, the EG content continued to gradually increase. Using the catalyst that was prepared in a molar ratio greater than 1.2 was found to result in the catalyst losing its transesterification capability for butylene terephthalate and favoring more PET polymerization, which led to a large increase of the polymerization time. The large increase in EG content in the backbone above a molar ratio of 1.2 affects the crystallinity of the resulting resin by lowering the melting temperature.

The melting temperatures of Examples 2 to 5 were similar to the melting temperature of the control (Example C-1). After the molar ratio of 1.2, however, the melting temperature gradually dropped. The melting temperature gradually decreased above the molar ratio of 1.2 and, below this molar ratio stayed very close to the melting temperature of the control Example C-1.

Based on the examples, it can be concluded that the synthesis of modified PBT from the melt polycondensation reaction between PET and BDO can be accomplished in the presence of new in situ catalyst prepared by the reaction of TYZOR® TPT catalyst and phosphoric acid prior to the depolymerization and ester interchange. Furthermore, the ratio between phosphoric acid and TPT can be controlled to obtain a PBT providing the same standard performance as virgin PBT shows. In these particular examples, the molar ratio of 1.2, with respect to the novel catalyst, was the maximum ratio for the process to obtain a molecular weight, IV, melting temperature and EG content within a given limit, wherein the molecular weight, IV and melting temperature decreased along with a catalyst-component molar ratio greater than 1.2. The catalyst-component molar ratio was found to affect the introduction of EG moieties in the PBT backbone, wherein above the molar ratio of 1.2, the EG content increased above 2 mol %, resulting in a crystallinity and melting temperature drop, whereas a total impurity level (isophthalic acid and EG) below 3 mole % provides a modified PBT resin with a standard performance similar to virgin PBT resin.

B. Comparative Example 9 (CE-9). Scale-Up Process for Preparing Modified PBT The reference process for preparing PBT is described in U.S. Pat. No. 7,902,263. A modified polybutylene random copolymer was derived from a polyethylene terephthalate component in a helicone reactor. The helicone reactor had a capacity of 40 liters and was equipped with a special design of twin opposing helical blades with 270 degree twist; constructed of 316 SS with 16 g polish finish. The blade speed varied from 1 to 65 rpm. The agitators were connected to a 7.5 HP Constant Torque Inverter Duty Motor, which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

25 lbs (11.4 kg) of recycled PET pellets and 35 lbs (15.9 kg) of BDO (molar ratio 2.9:1) were charged to the helicone reactor. 4.6 ml of TPT catalyst (100 ppm as Ti) were also added to the reaction mix. The temperature of the heating oil (for the helicone) was set to 250 C. The agitator speed was set at 67% of maximum. The BDO was refluxed into the reactor for 2 hours. It should be noted that the design of the overhead condenser system did not allow a complete reflux of the BDO. As a result, about 5 to 10 lbs (2.3 to 4.5 kg) of BDO that evolved in the initial stages could not be refluxed. The BDO evolved after the initial stages could be completely refluxed into the reactor.

For the polymerization stage (also referred to in this draft as 'poly stage'), a vacuum was applied to the helicone reactor and the reflux of BDO to the reactor was discontinued. The speed of the agitator was set to 60% of max and the target amps of the motor were 3.5 amps. The system pressure was brought down to 0.5 Torr (0.066 kPa) by the vacuum blower. The reaction was carried out until the polymer mass reached its $3^{rd}$ build. The reaction was stopped after 15 minutes into the $3^{rd}$ build and the polymer was cast in blobs. The product was allowed to dry and then was ground into pellets.

C. Examples 10-12. Improved Process for Preparing Modified PBT Using 1,4-Butanediol and Recycled Polyethylene Terephthalate by Melt or Solid State Polycondensation PBT was prepared in a pilot plant by reacting polyethylene terephthalate with 1,4-butanediol with catalyst ratios (TPT:PA) of 1:0, 1:0.25, 1:0.65, 1:0.8, 1:1, 1:1.2, and 1:1.5. All the resins were produced via a two-step process. The first step involved batch processing, including catalyst preparation, depolymerization, transesterification and polycondensation. An IV of 0.75 dL/g was targeted at the end of this process. The second step was the solid state polymerization processing, targeting an IV of 1.2 dL/g.

Melt Polymerization.

The melt polymerization process was carried in a pilot plant equipped with a single batch reactor. The process involved four steps: in-situ catalyst preparation, depolymerization of recycled PET (rPET), ester interchange (EI), and polymerization.

First, ethylene glycol (EG) and phosphoric acid (the amount used depended on the titanium catalyst concentration; See Table 2) were charged into the reactor and the reactor temperature was raised to 120° C. at atmospheric pressure (approximately 1050 mbar). The mixture was held at this temperature and atmospheric pressure for 30 minutes to remove moisture. The calculated amount of titanium isopropoxide (115 ppm of Ti based on the polymer wt.) was added into the reactor and the reactor temperature was raised to 170° C. The mixture was held at 170° C. for 70 minutes. Recycled PET (rPET) was then charged into the reactor (rPET:EG=1:1.5 mol). The reactor temperature was then increased to 225° C. and the pressure was set to 3.5 mbar.

Depolymerization of rPET to bis-hydroxy ethyl terephthalate (BHET) was completed in 90 minutes by holding the mixture at these conditions. After completion of depolymerization, the reactor was depressurized to 1050 mbar. BDO (rPET:BDO=1:3.6 mol ratio) was added to the reactor and the reactor temperature was maintained at 225° C. to complete atmospheric distillation until the column top temperature dropped. A vacuum of 700 mbar was applied gradually in the transesterification step to remove EG while maintaining the reactor temperature at 225° C. for 30 minutes and the overhead line temperature at 180° C. which allowed BDO reflux back into the reactor. EG and BDO were collected as overheads during the transesterification step. The batch was held at these conditions until the column top temperature dropped to 130° C. In the polymerization step, the reactor temperature was increased to 240° C. and a vacuum was applied by gradually reducing the pressure to approximately 1 mbar, to remove excess BDO, THF, and EG as overheads. After stabilizing the vacuum at approximately 1 mbar and the reactor temperature between 240 and 250° C., the torque in the reactor was monitored until achieving the required intrinsic viscosity (IV) (between 0.7 and 0.8 dL/g). Finally, the polymer melt was drained and then pelletized.

Solid State Polymerization.

In order to get a high value of IV (1.17-1.25 dL/g) for the resin prepared from rPET, low viscosity resins obtained from the batch process were subjected to solid state polymerization in a tumbling reactor at 100 mbar pressure at a temperature of 200° C. for about 18 to 30 h. The IV was checked intermittently during the viscosity build-up and a product with a final IV value of 1.25 was obtained.

Results

Table 4 summarizes the process parameters and results for Comparative Example 9 (CE-9), Example 10 (E-10), Example 11 (E-11), and Example 12 (E-12) resins. CE-9 resin was prepared through conventional titanium based catalyst using the process disclosed in U.S. Pat. No. 7,902,263 as described in Part B. E-10, E-11, and E-12 were prepared according to the new process as provided in Part C and had TPT:PA ratios of 1:0.25, 1:0.65, and 1:0.8, respectively. Color (L*, a*, and b*) values were obtained for each example.

After the batch process, each resin met the targeted IV, and all batches had the same color and the same carboxylic acid end group concentration (CEG). The polymerization cycle time was decreased for the batches using the new catalyst, indicating that the phosphoric acid content of the catalyst contributes to the polymerization process by promoting catalysis. However, increased concentration of phosphoric acid in the catalyst did not show a significant effect on the polymerization cycle time.

After solid state polymerization, all resins achieved an IV close to 1.2 dL/g with low carboxylic end group (CEG) values (approximately 10 meq/g). The processing temperature was 200° C. The IV build-up rate decreased as the phosphoric acid content in the in-situ catalyst increased.

TABLE 4

Process Parameters and Results of PBT Resins Prepared in Pilot Plant

| | | VALUE ACHIEVED | | | | | | |
|---|---|---|---|---|---|---|---|---|
| | UNITS | CE-9 | E-10 | | E-11 | | E-12 | |
| BATCH PARAMETER | | | | | | | | |
| Batch weight | Kg | 10 | 10 | 10 | 10 | 10 | 10 | 10 |
| Molar ratio (PET:BDO) | Ratio | 1:3.6 | 1:3.6 | 1:3.6 | 1:3.6 | 1:3.6 | 1:3.6 | 1:3.6 |
| White Flakes/PCR PET CHIPS | Kg | 8.727 | 8.727 | 8.727 | 8.727 | 8.727 | 8.727 | 8.727 |
| MEG FOR DEPOLY | Kg | 4.227 | 4.227 | 4.227 | 4.227 | 4.227 | 4.227 | 4.227 |
| BDO | Kg | 14.727 | 14.727 | 14.727 | 14.727 | 14.727 | 14.727 | 14.727 |
| TPT - CATALYST (115 ppm) | g | 6.81 | 6.81 | 6.81 | 6.81 | 6.81 | 6.81 | 6.81 |
| PA (85% p) | g | N/A | 0.69 | 0.69 | 1.79 | 1.79 | 2.2 | 2.2 |
| Molar ratio (TPT:PA) | — | — | 1:0.25 | 1:0.25 | 1:0.65 | 1:0.65 | 1:0.8 | 1:0.8 |
| IV | dl/g | 0.778 | 0.728 | 0.746 | 0.731 | 0.722 | 0.705 | 0.715 |
| L | CIE | 67.5 | 70.0 | 69.0 | 68.8 | 66.7 | 69.4 | 71.2 |
| a | CIE | −1.80 | −1.70 | −1.50 | −1.60 | −1.20 | −1.50 | −1.60 |
| b | CIE | 2.0 | 2.8 | 2.8 | 3.4 | 4.8 | 3.5 | 2.8 |
| Carboxylic Acid End Group (CEG) Conc. | meq/g | 13.0 | 13.0 | 13.0 | 23.0 | 23.0 | 13.0 | 14.0 |
| Total Esterification time | min | 625 | 645 | 645 | 650 | 630 | 640 | 640 |
| Esterification end temp | C | 225 | 225 | 225 | 225 | 225 | 225 | 225 |
| Polymerization cycle time | min | 200 | 175 | 175 | 172 | 170 | 165 | 170 |
| Polymerization final temp | ° C. | 250 | 250 | 250 | 250 | 250 | 250 | 250 |
| SSP PARAMETER | | | | | | | | |
| SSP PARAMETERS (Batch size) | kg | 7 | 16 | | 15 | | 16 | |
| IV | d/g | 1.192 | 1.212 | | 1.227 | | 1.223 | |
| L* | CIE Lab | 72 | 72 | | 71.45 | | 71.8 | |
| a* | CIE Lab | −1.3 | −1.4 | | −1.1 | | −1.0 | |
| b* | CIE Lab | 4.2 | 4.3 | | 4.8 | | 4.5 | |
| CEG | meq/g | 12 | 11 | | 18 | | 8 | |
| Processing temperature | ° C. | 195 | 200 | | 200 | | 200 | |
| Delta IV Increase | dl/g | 0.414 | 0.475 | | 0.500 | | 0.513 | |
| Residence time at reaction temperature | Hrs | 18 | 20 | | 27 | | 26 | |
| IV build up rate | units/hr | 0.0230 | 0.02375 | | 0.0185 | | 0.0195 | |

Table 5 shows the process parameters and results for E-13, E-14, and E-15 resins, which were also prepared via the new process, and had TPT:PA ratios of 1:1, 1:1.2, and 1:1.5, respectively. All three resins reached IV values that were lower than the target. The polymerization cycle time increased along with the increase of the phosphoric acid content of the examples. The L* values of the resulting resins decreased compared to resins summarized in Table 3. A reason for the lower L* values may be the decrease of crystallinity due to the insertion of PET block within the backbone. Since the melting temperature of the resulting resins was lower, the solid state polymerization was unsuccessful. The IV build-up to the targeted IV was extremely slow for the final resins.

Both Tables 4 and 5 show that the ratio between TPT and phosphoric acid in the preparation of the catalyst directly affects depolymerization and polycondensation. For TPT:PA ratios above 1:0.8, the depolymerization step was not completed and a large extent of PET insertion was observed, resulting in lower melting temperature and L* value, indicating less crystalline product.

TABLE 5

Process Parameters and Results of PBT Resins Prepared in Pilot Plant

| PARAMETER | UNITS | E-13 | E-14 | E-15 | E-15 |
|---|---|---|---|---|---|
| Batch weight | Kg | 10 | 10 | 10 | 10 |
| Molar ratio (PET:BDO) | Ratio | 1:3.6 | 1:3.6 | 1:3.6 | 1:3.6 |
| White Flakes/PCR PET CHIPS | Kg | 8.727 | 8.727 | 8.727 | 8.727 |
| MEG FOR DEPOLY | Kg | 4.227 | 4.227 | 4.227 | 4.227 |
| BDO | Kg | 14.727 | 14.727 | 14.727 | 14.727 |
| TPT-CATALYST (115 ppm) | g | 6.81 | 6.81 | 6.81 | 6.81 |
| Phosphoric Acid (85% p) | g | 2.8 | 2.8 | 3.3 | 4.1 |
| Molar ratio (TPT:PA) | — | 1:1.0 | 1:1.0 | 1:1.2 | 1:1.5 |
| IV | dl/g | 0.688 | 0.687 | 0.667 | 0.670 |
| L | CIE | 54.5 | 56.5 | 52.1 | 52.0 |
| a | CIE | 0.50 | -0.40 | 0.70 | 0.90 |
| b | CIE | 5.8 | 6.0 | 3.3 | 4.7 |
| CEG | meq/g | 25.0 | 24.0 | 27.0 | 26.0 |
| Total Esterification time | min | 675 | 680 | 690 | 775 |
| Esterification end temp | C | 225 | 225 | 226 | 225 |
| Poly cycle time | min | 280 | 295 | 310 | 330 |
| Poly final temp | °C. | 250 | 250 | 250 | 250 |
| SSP PARAMETERS (Batch size) | kg | No Build | No Build | No Build | No Build |
| IV | d/g | | | | |
| L* | CIE Lab | | | | |
| a* | CIE Lab | | | | |
| b* | CIE Lab | | | | |
| Processing temperature | °C. | | | | |
| Delta IV Increase | dl/g | | | | |
| Residence time at reaction temperature | Hrs | | | | |
| IV build up rate | units/hr | | | | |

D. Hydrostability Studies of Thermoplastic Compositions Containing Modified PBT Prepared According to Part C The hydrostability of various compositions containing modified PBT made using the process described in Part C was evaluated in comparison to compositions containing PBT prepared according to Part B (CE-16 and CE-20). The compositions were 30 percent glass-filled impact-modified PBT grades, optionally containing the chain extender 3,4-epoxycyclohexylmethyl-3',4'-epoxycyclohexane carboxylate. The thermoplastic compositions were prepared as described in the Extrusion, Molding and Testing Section of this application.

Table 6 summarizes the formulations that were evaluated as well as their mechanical properties. All of the examples showed equivalent mechanical properties with the respect to flexural, impact (both room temperature and low temperature), and tensile properties compared to CE-16 and CE-20.

TABLE 6

Formulation of Valox Samples used in Hydrostability Evaluation

| Item Description | Unit | CE-16 | E-17 | E-18 | E-19 | CE-20 | E-21 | E-22 | E-23 |
|---|---|---|---|---|---|---|---|---|---|
| Sodium Stearate | | 0.05 | 0.05 | 0.05 | 0.05 | 0.05 | 0.05 | 0.05 | 0.05 |
| Chain Extender | % | 1.7 | 1.7 | 1.7 | 1.7 | 0 | 0 | 0 | 0 |
| Hindered Phenol Stabilizer | % | 0.04 | 0.04 | 0.04 | 0.04 | 0.04 | 0.04 | 0.04 | 0.04 |
| Linear Low Density Polyethylene | % | 5 | 5 | 5 | 5 | 5 | 5 | 5 | 5 |
| Standard 13 Micron PBT Glass | % | 30 | 30 | 30 | 30 | 30 | 30 | 30 | 30 |
| PE-I TPT:PA = 1:0 | | 63.21 | 0 | 0 | 0 | 64.91 | 0 | 0 | 0 |
| PE-II TPT:PA = 1:0.25 | | 0 | 63.21 | 0 | 0 | 0 | 64.91 | 0 | 0 |
| PE-II TPT:PA = 1:0.65 | | 0 | 0 | 63.21 | 0 | 0 | 0 | 64.91 | 0 |
| PE-II TPT:PA = 1:0.8 | | 0 | 0 | 0 | 63.21 | 0 | 0 | 0 | 64.91 |
| | | 100 | 100 | 100 | 100 | 100 | 100 | 100 | 100 |
| OPA/TPT | | 0 | 0.25 | 0.65 | 0.8 | 0 | 0.25 | 0.65 | 0.8 |
| Mechanical | | | | | | | | | |
| FM | MPa | 7780 | 8030 | 7970 | 7810 | 7970 | 7940 | 7860 | 7910 |
| FS | MPa | 180 | 186 | 183 | 181 | 175 | 179 | 173 | 175 |
| NIIS, 23 C | J/m | 130 | 126 | 138 | 145 | 131 | 139 | 128 | 137 |
| UIIS, 23 C | J/m | 799 | 778 | 781 | 761 | 762 | 765 | 748 | 771 |
| TM | MPa | 9088 | 9116 | 9286 | 9288 | 9136 | 9162 | 9106 | 9304 |
| TS @ Yield | MPa | 115 | 117 | 117 | 117 | 114 | 115 | 110 | 113 |
| TS @ Break | MPa | 112 | 112 | 114 | 114 | 111 | 112 | 106 | 109 |
| TE @ Yield | % | 2.66 | 2.76 | 2.76 | 2.74 | 2.46 | 2.58 | 2.40 | 2.50 |
| TE @ Break | % | 3.06 | 3.46 | 3.48 | 3.44 | 2.86 | 3.00 | 2.96 | 3.10 |

TABLE 6-continued

Formulation of Valox Samples used in Hydrostability Evaluation

| Item Description | Unit | CE-16 | E-17 | E-18 | E-19 | CE-20 | E-21 | E-22 | E-23 |
|---|---|---|---|---|---|---|---|---|---|
| Rheological | | | | | | | | | |
| MVR | cm³/10 min | 9.78 | 7.73 | 5.29 | 5.99 | 8.06 | 6.33 | 6.32 | 5.97 |
| Thermal | | | | | | | | | |
| Deflection temp-Avg | ° C. | 198 | 195 | 194 | 193 | 199 | 195 | 193 | 193 |

Figure 2:
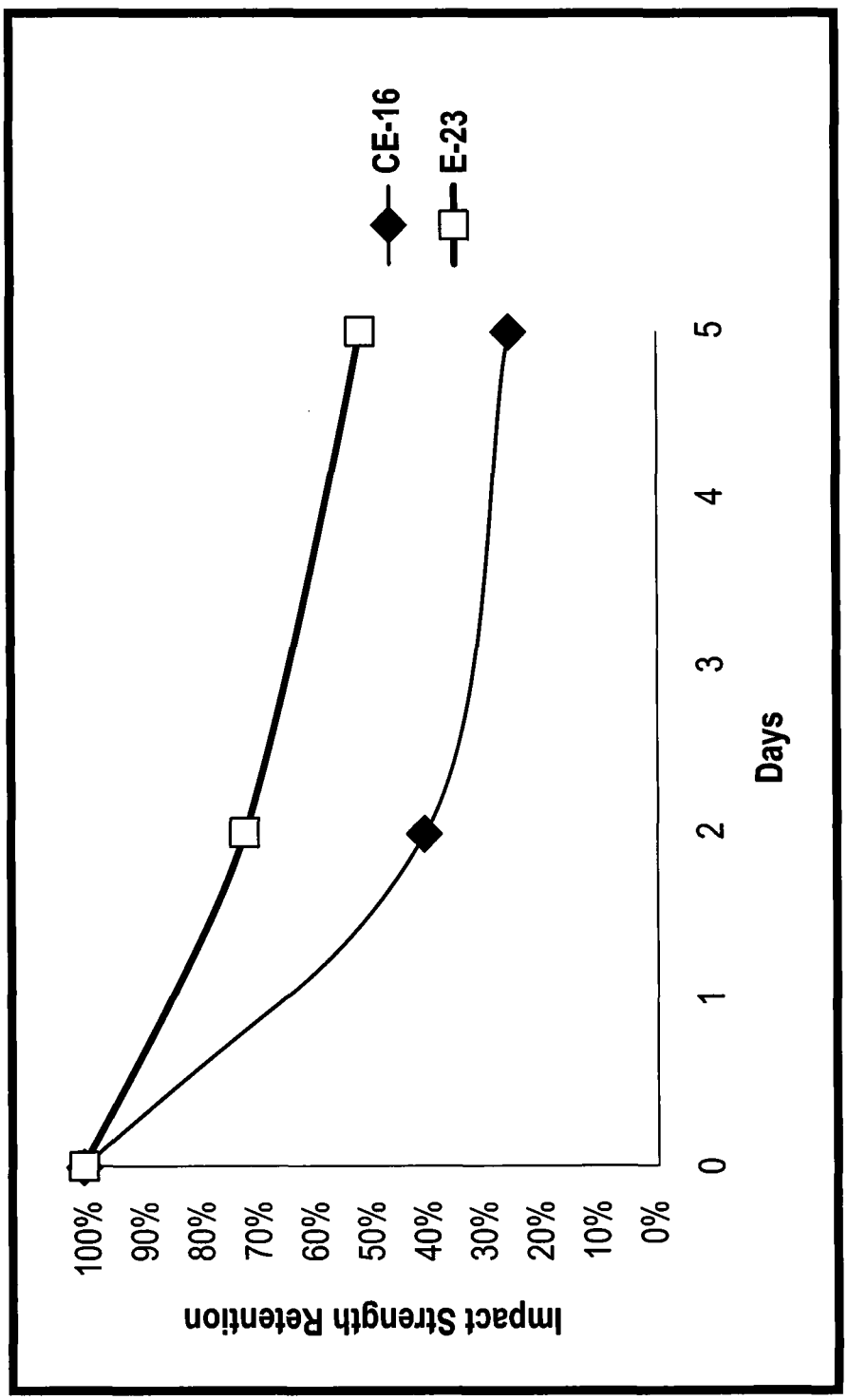
FIG. 2 shows impact strength retention as a function of hydro-aging time for compositions containing modified PBT.

Impact strength and tensile strength retention after hydro-aging under 110° C. and 100% relative humidity in a pressure cooker is reported in Table 7. All of the examples had improved notched impact strength and tensile strength on Days 2 and 5 over CE-16, which contained the chain extender. CE-16 (with chain extender) maintained 27% of its impact strength and 48% of its tensile strength after 5 days hydro-aging in a pressure cooker, whereas E-23 (without chain extender) maintained 52% of its impact strength and 94% of its tensile strength after 5 days of hydro-aging in a pressure cooker. These observations are depicted in FIGS. 1 and 2. In other words, E-23 (without epoxy chain extender) showed 2 times better unnotched impact strength retention and 2 times better tensile strength retention compared to CE-16 which included an epoxy chain extender. This result indicates that the resin prepared according to Process C provides compositions with superior hydrostability and indicates that the presence of an epoxy chain extender in the formulations is not necessary.

The invention claimed is:

1. A thermoplastic composition with improved hydrostability, comprising:
    0.05 percent by weight of sodium stearate;
    0.04 percent by weight of a stabilizer which is pentaerythritoltetrakis(3-(3,5-di-tert butyl-4-hydroxy-phenyl-)propionate);
    5 percent by weight of linear low density polyethylene;
    30 percent by weight of glass fiber; and
    64.91 percent by weight of a modified polybutylene terephthalate prepared from polyethylene terephthalate in the presence of 1,4-butane diol and a catalyst containing phosphoric acid (PA) and 115 ppm titanium as tetraisopropyl titanate based on the polymer weight, wherein the molar ratio of tetraisopropyl titanate: phosphoric acid is 1:0.8; wherein the catalyst is generated before being combined with polyethylene terephthalate, wherein the process for preparing the modified polybutylene terephthalate comprises:
        forming a catalyst solution comprising a catalyst that is the reaction product of phosphoric acid (PA) and 115

TABLE 7

Hydrostability of Table 5 Compositions

| | Properties | Unit | CE-16 | E-17 | E-18 | E-19 | CE-20 | E-21 | E-22 | E-23 |
|---|---|---|---|---|---|---|---|---|---|---|
| | 110° C./100% R.H. Pressure Cooker | | w Chain Extender | w Chain Extender | w Chain Extender | w Chain Extender | w/o Chain Extender | w/o Chain Extender | w/o Chain Extender | w/o Chain Extender |
| | TPT:PA | | 1:0 | 1:0.25 | 1:0.65 | 1:0.8 | 1:0 | 1:0.25 | 1:0.65 | 1:0.8 |
| t = 0 | Notched Impact Strength | J/m | 799 | 778 | 781 | 761 | 762 | 765 | 748 | 771 |
| t = 2 day | Notched Impact Strength | J/m | 323 | 417 | 471 | 456 | 528 | 574 | 443 | 556 |
| t = 5 day | Notched Impact Strength | J/m | 205 | 267 | 297 | 332 | 459 | 403 | 242 | 399 |
| t = 0 | Tensile Strength Avg | % | 112 | 112 | 114 | 114 | 111 | 112 | 106 | 109 |
| t = 2 day | Tensile Strength-Avg | % | 83 | 92 | 94 | 95 | 101 | 103 | 100 | 101 |
| t = 5 day | Tensile Strength-Avg | % | 53 | 71 | 75 | 104 | 76 | 102 | 79 | 102 |

The foregoing disclosure has been described in some detail by way of illustration and example for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

ppm titanium as tetraisopropyl titanate based on the polymer weight, which catalyst is synthesized in situ, prior to depolymerization of the polyethylene terephthalate, by combining, at an elevated first temperature, the tetraisopropyl titanate and phosphoric acid in butanediol and/or ethylene glycol, wherein the catalyst is formed employing a tetraisopropyl titanate: phosphoric acid molar ratio of 1:0.8;
subjecting the depolymerized mixture to heat to melt residual particles of polyethylene terephthalate at an elevated third temperature higher than the second temperature to obtain a molten depolymerized mixture;
polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and subjecting the polymerized mixture to solid state polymerization at approximately 100 mbar (75 Torr) pressure and a temperature of approximately 200° C. for about 18 to 30 h to obtain a modified polybutylene terephthalate;

wherein:

the thermoplastic composition does not contain a chain extender or quencher; and the thermoplastic composition has improved notched impact strength and tensile strength measured at days 2 and 5 of hydroaging at 110° C. and 100% relative humidity in a pressure cooker as compared to a thermoplastic composition comprising:

0.05 percent by weight of sodium stearate;

1.7 percent by weight of 3,4-epoxycyclohexylmethyl-3',4'-epoxycyclohexane carboxylate;

0.04 percent by weight of a stabilizer which is pentaerythritoltetrakis(3-(3,5-di-tert butyl-4-hydroxy-phenyl-)propionate);

5 percent by weight of linear low density polyethylene;

30 percent by weight of glass fiber; and 63.21 percent by weight of a modified polybutylene terephthalate containing 115 ppm tetraisopropyl titanate and no phosphoric acid and having an intrinsic viscosity of 1.2 cm$^3$/g as measured in a 60:40 phenol/tetrachloroethane.

* * * * *